US012428814B2

(12) United States Patent
Horii

(10) Patent No.: US 12,428,814 B2
(45) Date of Patent: Sep. 30, 2025

(54) WORKING MACHINE

(71) Applicant: KUBOTA CORPORATION, Osaka (JP)

(72) Inventor: Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 417 days.

(21) Appl. No.: 18/079,628

(22) Filed: Dec. 12, 2022

(65) Prior Publication Data

US 2023/0112211 A1 Apr. 13, 2023

Related U.S. Application Data

(63) Continuation of application No. PCT/JP2021/049021, filed on Dec. 29, 2021.

(30) Foreign Application Priority Data

| | | | |
|---|---|---|---|
| Jan. 27, 2021 | (JP) | ................................ | 2021-011438 |
| Jan. 27, 2021 | (JP) | ................................ | 2021-011439 |
| Dec. 29, 2021 | (JP) | ................................ | 2021-215364 |

(51) Int. Cl.
*E02F 9/22* (2006.01)
*E02F 3/32* (2006.01)
(Continued)

(52) U.S. Cl.
CPC ............ *E02F 9/2203* (2013.01); *E02F 3/325* (2013.01); *E02F 3/425* (2013.01); *E02F 3/435* (2013.01);
(Continued)

(58) Field of Classification Search
CPC ...... E02F 9/2253; E02F 9/2285; E02F 9/2203
See application file for complete search history.

(56) References Cited

U.S. PATENT DOCUMENTS

| | | | | |
|---|---|---|---|---|
| 10,330,128 B2 * | 6/2019 | Moriki | ...................... | E02F 3/32 |
| 2008/0034748 A1 | 2/2008 | Koo | | |

(Continued)

FOREIGN PATENT DOCUMENTS

| | | | | |
|---|---|---|---|---|
| CA | 2897003 A1 * | 7/2014 | ............ | E02F 9/2217 |
| EP | 2837831 A1 * | 2/2015 | .............. | E02F 3/325 |

(Continued)

OTHER PUBLICATIONS

Official Communication issued in International Bureau of WIPO Patent Application No. PCT/JP2021/049021, dated Feb. 15, 2022, along with an English translation thereof.

(Continued)

*Primary Examiner* — Abiy Teka
(74) *Attorney, Agent, or Firm* — GREENBLUM & BERNSTEIN, P.L.C.

(57) ABSTRACT

A working machine includes a machine body, a first hydraulic actuator mounted on the machine body, a first control valve that controls the first hydraulic actuator, a controller that controls the first control valve, and a second hydraulic actuator that is different from the first hydraulic actuator. When the second hydraulic actuator and the first hydraulic actuator are operated in combination, the controller reduces the amount of change in the flow rate of a hydraulic fluid supplied from the first control valve to the first hydraulic actuator with respect to changes in a manipulation amount to operate the first hydraulic actuator to a value smaller than that when the first hydraulic actuator is solely operated.

14 Claims, 15 Drawing Sheets

(51) Int. Cl.

| | |
|---|---|
| ***E02F 3/42*** | (2006.01) |
| ***E02F 3/43*** | (2006.01) |
| ***E02F 9/20*** | (2006.01) |
| ***F15B 13/02*** | (2006.01) |
| ***F15B 13/06*** | (2006.01) |
| ***F15B 15/00*** | (2006.01) |

(52) U.S. Cl.
CPC .......... *E02F 9/2004* (2013.01); *E02F 9/2253* (2013.01); *E02F 9/2285* (2013.01); *E02F 9/2292* (2013.01); *E02F 9/2296* (2013.01); *F15B 13/02* (2013.01); *F15B 13/06* (2013.01); *F15B 15/00* (2013.01)

(56) References Cited

U.S. PATENT DOCUMENTS

| | | | |
|---|---|---|---|
| 2009/0077839 | A1 | 3/2009 | Horii |
| 2012/0067443 | A1 | 3/2012 | Horii |

FOREIGN PATENT DOCUMENTS

| | | | | |
|---|---|---|---|---|
| EP | 3 121 453 | A1 | | 1/2017 |
| EP | 3 623 534 | A1 | | 3/2020 |
| JP | 7189296 | A | * | 7/1995 |
| JP | 2004 324208 | A | | 11/2004 |
| JP | 2009 079366 | A | | 4/2009 |
| JP | 2012 067459 | A | | 4/2012 |
| JP | 2014 020395 | A | | 2/2014 |
| JP | 2014 142032 | A | | 8/2014 |
| JP | 2015 110981 | A | | 6/2015 |
| JP | 2017-110721 | A | | 6/2017 |

OTHER PUBLICATIONS

Official Communication, dated Nov. 26, 2024, issued in European Patent Office (EPO) family member Patent Application No. 21923306.1.

Office Action, dated Dec. 3, 2024, issued in Japan family member Patent Appl. No. 2021-215364 with an English translation thereof.

* cited by examiner

WORKING MACHINE

CROSS REFERENCE TO RELATED APPLICATIONS

This application is a continuation application of International Application No. PCT/JP2021/049021, filed on Dec. 29, 2021 which claims the benefit of priority to Japanese Patent Application No. 2021-011438, filed on Jan. 27, 2021, to Japanese Patent Application No. 2021-011439, filed on Jan. 27, 2021, and to Japanese Patent Application No. 2021-215364, filed on Dec. 29, 2021. The entire contents of each of these applications are hereby incorporated herein by reference.

BACKGROUND OF THE INVENTION

1. Field of the Invention

The present invention relates to a working machine such as a backhoe.

2. Description of the Related Art

In the related art, a working machine disclosed in Japanese Unexamined Patent Application Publication No. 2009-79366 is known.

The working machine disclosed in Japanese Unexamined Patent Application Publication No. 2009-79366 includes a boom that is supported on a machine body so as to be vertically swingable. The boom is driven by a boom cylinder.

The working machine disclosed in Japanese Unexamined Patent Application Publication No. 2009-79366 further includes a traveling device that supports the machine body so as to enable the machine body to travel. The traveling device is driven by a driving motor that is a hydraulic motor.

SUMMARY OF THE INVENTION

For example, when a boom cylinder and another hydraulic actuator different from the boom cylinder are operated in combination, there is a case where a boom and another member that is driven by the other hydraulic actuator do not move harmoniously.

In addition, when another hydraulic actuator different from a traveling motor is operated while a working machine is traveling, there is a problem in that the flow rate of a hydraulic fluid supplied to the traveling motor decreases as a result of some of the hydraulic fluid being supplied to the other hydraulic actuator, so that the traveling speed of the working machine decreases, which in turn results in a shock.

The present invention has been made in view of the above problem, and it is an object of the present invention to provide a working machine capable of causing a member that is operated by a first hydraulic actuator and a member that is operated by a second hydraulic actuator to move harmoniously.

It is another object of the present invention to provide a working machine capable of suppressing a reduction of the traveling speed of the working machine that occurs when another hydraulic actuator different from a traveling motor is operated while the working machine is traveling.

A working machine according to an aspect of the present invention includes a machine body, a first hydraulic actuator mounted on the machine body, a first control valve to control the first hydraulic actuator, a controller to control the first control valve, and a second hydraulic actuator that is different from the first hydraulic actuator. When the second hydraulic actuator and the first hydraulic actuator are operated in combination, the controller reduces an amount of change in a flow rate of a hydraulic fluid that is supplied from the first control valve to the first hydraulic actuator with respect to a change in a manipulation amount to operate the first hydraulic actuator to a value smaller than an amount of change in the flow rate of the hydraulic fluid with respect to the change in the manipulation amount to operate the first hydraulic actuator when the first hydraulic actuator is solely operated.

The working machine may further include a boom supported on the machine body in such a manner as to be vertically swingable. The first hydraulic actuator may be a boom cylinder to cause the boom to vertically swing. The first control valve may be a boom control valve to control the boom cylinder. The second hydraulic actuator may be another hydraulic actuator that is different from the boom cylinder.

The controller may include a boom flow-rate reducing unit to reduce, when the boom cylinder is operated while the other hydraulic actuator is operated, the flow rate of the hydraulic fluid supplied from the boom control valve to the boom cylinder to thereby reduce the amount of change in the flow rate.

The boom control valve may be pilot-operated by a pilot control pressure that is controlled by a control signal transmitted by the controller. The boom flow-rate reducing unit may reduce the pilot control pressure when the boom cylinder is operated while the other hydraulic actuator is operated.

The boom control valve may be controlled in accordance with a current that is supplied to the boom control valve by the controller. The boom flow-rate reducing unit may reduce the current supplied to the boom control valve when the boom cylinder is operated while the other hydraulic actuator is operated.

The working machine may further include an arm connected to an end of the boom in such a manner as to be swingable in an arm-crowd direction that is a direction toward the boom and an arm-dump direction that is a direction away from the boom and an arm cylinder to cause the arm to swing. The other hydraulic actuator may be the arm cylinder. When the boom cylinder is operated while the arm cylinder is operated, the boom flow-rate reducing unit may reduce the flow rate of the hydraulic fluid supplied from the boom control valve to the boom cylinder.

The boom flow-rate reducing unit may reduce the flow rate of the hydraulic fluid supplied from the boom control valve to the boom cylinder when the boom is raised while swinging the arm in the arm-crowd direction or when the boom is lowered while swinging the arm in the arm-dump direction.

The working machine may further include a manipulator manipulable to operate the boom cylinder, the manipulation amount being defined as a manipulation amount of the manipulator. The controller may include a control unit to control the flow rate of the hydraulic fluid supplied from the boom control valve to the boom cylinder in accordance with the manipulation amount of the manipulator when the boom cylinder is solely operated. The boom flow-rate reducing unit may cause the hydraulic fluid supplied from the boom control valve to the boom cylinder to have a flow rate with respect to the manipulation amount of the manipulator that is lower than a flow rate of the hydraulic fluid controlled by the control unit in accordance with the manipulation amount.

The controller may include a boom flow-rate increasing unit to determine the flow rate of the hydraulic fluid supplied from the boom control valve with respect to the manipulation amount to operate the boom cylinder when the other hydraulic actuator and the boom cylinder are operated in combination so that, when the manipulation amount to operate the boom cylinder is a manipulation amount adjacent to a pre-operation region to start operating the boom control valve, the flow rate determined by the boom flow-rate increasing unit is higher than the flow rate of the hydraulic fluid supplied from the boom control valve with respect to the manipulation amount to operate the boom cylinder when the boom cylinder is solely operated, and so that, as the manipulation amount to operate the boom cylinder increases, a difference between the flow rate of the hydraulic fluid with respect to the manipulation amount to operate the boom cylinder when the other hydraulic actuator and the boom cylinder are operated in combination and the flow rate of the hydraulic fluid from the boom control valve with respect to the manipulation amount to operate the boom cylinder when the boom cylinder is solely operated reduces to thereby reduce the amount of change in the flow rate when the other hydraulic actuator and the boom cylinder are operated in combination.

The boom control valve may be pilot-operated by a pilot control pressure controlled by a control signal transmitted by the controller. The boom flow-rate increasing unit may increase the pilot control pressure when the other hydraulic actuator and the boom cylinder are operated in combination.

The boom control valve may be controlled in accordance with a current supplied to the boom control valve by the controller. The boom flow-rate increasing unit may increase the current supplied to the boom control valve when the other hydraulic actuator and the boom cylinder are operated in combination.

The working machine may further include an arm connected to an end of the boom in such a manner as to be swingable in an arm-crowd direction that is a direction toward the boom and an arm-dump direction that is a direction away from the boom and an arm cylinder to cause the arm to swing. The other hydraulic actuator may be the arm cylinder. When the boom cylinder is operated while the arm cylinder is operated, the boom flow-rate increasing unit may increase the flow rate of the hydraulic fluid supplied from the boom control valve to the boom cylinder.

The boom flow-rate increasing unit may increase the flow rate of the hydraulic fluid supplied from the boom control valve to the boom cylinder when the boom is raised while swinging the arm in the arm-crowd direction or when the boom is lowered while swinging the arm in the arm-dump direction.

The working machine may further include a manipulator manipulable to operate the boom cylinder, the manipulation amount being defined as a manipulation amount of the manipulator. The controller may include a control unit to control the flow rate of the hydraulic fluid supplied from the boom control valve to the boom cylinder in accordance with the manipulation amount of the manipulator when the boom cylinder is solely operated. The boom flow-rate increasing unit may cause the hydraulic fluid supplied from the boom control valve to the boom cylinder to have a flow rate with respect to the manipulation amount of the manipulator that is higher than a flow rate of the hydraulic fluid controlled by the control unit in accordance with the manipulation amount.

The controller may not allow the boom flow-rate increasing unit to function when the other hydraulic actuator is operated while the boom cylinder is solely operated in a direction in which the boom is raised.

The working machine may further include a traveling device to travel and support the machine body. The second hydraulic actuator may be a traveling motor defined as a hydraulic motor to drive the traveling device. The first hydraulic actuator may be another hydraulic actuator that is different from the traveling motor. The first control valve may be an actuator control valve to control the other hydraulic actuator. The controller may include an actuator flow-rate reducing unit to reduce the flow rate of the hydraulic fluid supplied from the actuator control valve to the other hydraulic actuator when the other hydraulic actuator is operated while the traveling motor is driven.

The actuator control valve may be pilot-operated by a pilot control pressure that is controlled by a control signal transmitted by the controller. The actuator flow-rate reducing unit may reduce the pilot control pressure when the other hydraulic actuator is operated while the traveling device is driven.

The actuator control valve may be controlled in accordance with a current supplied to the actuator control valve by the controller. The actuator flow-rate reducing unit may reduce the current supplied to the actuator control valve when the other hydraulic actuator is operated while the traveling device is driven.

The working machine may further include a manipulator manipulable to operate the other hydraulic actuator, the manipulation amount being defined as a manipulation amount of the manipulator. The controller may include a control unit to control the flow rate of the hydraulic fluid supplied from the actuator control valve to the other hydraulic actuator in accordance with the manipulation amount of the manipulator when the other hydraulic actuator is solely operated. The actuator flow-rate reducing unit may cause the hydraulic fluid supplied from the actuator control valve to the other hydraulic actuator to have a flow rate with respect to the manipulation amount of the manipulator that is lower than a flow rate of the hydraulic fluid controlled by the control unit in accordance with the manipulation amount.

The working machine may further include a boom cylinder to drive a boom supported on the machine body in such a manner as to be vertically swingable, an arm cylinder to drive an arm connected to an end of the boom in such a manner as to be swingable, a working-tool cylinder to drive a working tool connected to an end of the arm, and a slewing motor to cause the machine body to turn around an axis extending in a vertical direction and that is a hydraulic motor. The other hydraulic actuator may include at least one of the boom cylinder, the arm cylinder, the working-tool cylinder, and the slewing motor.

The working machine may further include a variable displacement pump to deliver a hydraulic fluid to actuate a plurality of hydraulic actuators including the first hydraulic actuator and the second hydraulic actuator and a load sensing system to control the pump such that a differential pressure obtained by subtracting the highest load pressure among load pressures of the plurality of hydraulic actuators from a delivery pressure of the pump is kept constant.

A working machine according to another aspect of the present invention includes a machine body, a traveling device to travel and support the machine body, a traveling motor defined as a hydraulic motor to drive the traveling device, another hydraulic actuator that is different from the traveling motor, an actuator control valve to control the other hydraulic actuator, and a controller to control the actuator control valve. The controller includes an actuator flow-rate reducing unit to reduce a flow rate of a hydraulic fluid that is supplied from the actuator control valve to the other hydraulic actuator when the other hydraulic actuator is operated while the traveling device is driven.

The actuator control valve may be pilot-operated by a pilot control pressure that is controlled by a control signal transmitted by the controller. The actuator flow-rate reducing unit may reduce the pilot control pressure when the other hydraulic actuator is operated while the traveling device is driven.

The actuator control valve may be controlled in accordance with a current supplied to the actuator control valve by the controller. The actuator flow-rate reducing unit may reduce the current supplied to the actuator control valve when the other hydraulic actuator is operated while the traveling device is driven.

The working machine may further include a manipulator manipulable to operate the other hydraulic actuator, the manipulation amount being defined as a manipulation amount of the manipulator. The controller may include a control unit to control the flow rate of the hydraulic fluid supplied from the actuator control valve to the other hydraulic actuator in accordance with the manipulation amount of the manipulator when the other hydraulic actuator is solely operated. The actuator flow-rate reducing unit may cause the hydraulic fluid supplied from the actuator control valve to the other hydraulic actuator to have a flow rate with respect to the manipulation amount of the manipulator that is lower than a flow rate of the hydraulic fluid controlled by the control unit in accordance with the manipulation amount.

The working machine may further include a boom cylinder to drive a boom supported on the machine body in such a manner as to be vertically swingable, an arm cylinder to drive an arm connected to an end of the boom in such a manner as to be swingable, a working-tool cylinder to drive a working tool connected to an end of the arm, and a slewing motor to cause the machine body to turn around an axis extending in a vertical direction and that is a hydraulic motor. The other hydraulic actuator may include at least one of the boom cylinder, the arm cylinder, the working-tool cylinder, and the slewing motor.

The working machine may further include a variable displacement pump to deliver a hydraulic fluid to actuate a plurality of hydraulic actuators including the traveling motor and the other hydraulic actuator and a load sensing system to control the pump such that a differential pressure obtained by subtracting the highest load pressure among load pressures of the plurality of hydraulic actuators from a delivery pressure of the pump is kept constant.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
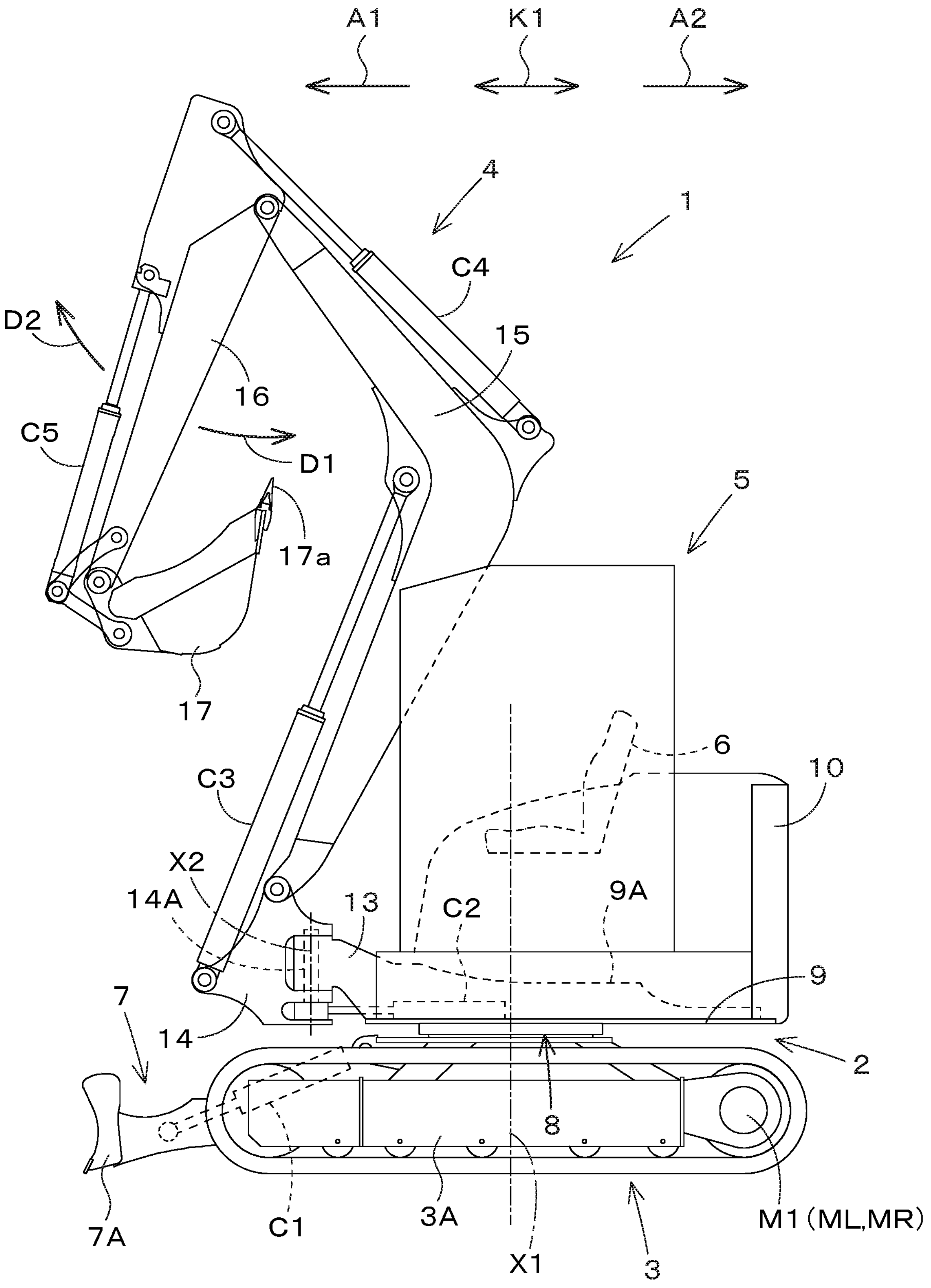
FIG. 1 a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Embodiments of the present invention will be described below with reference to the drawings as necessary.

Figure 2:
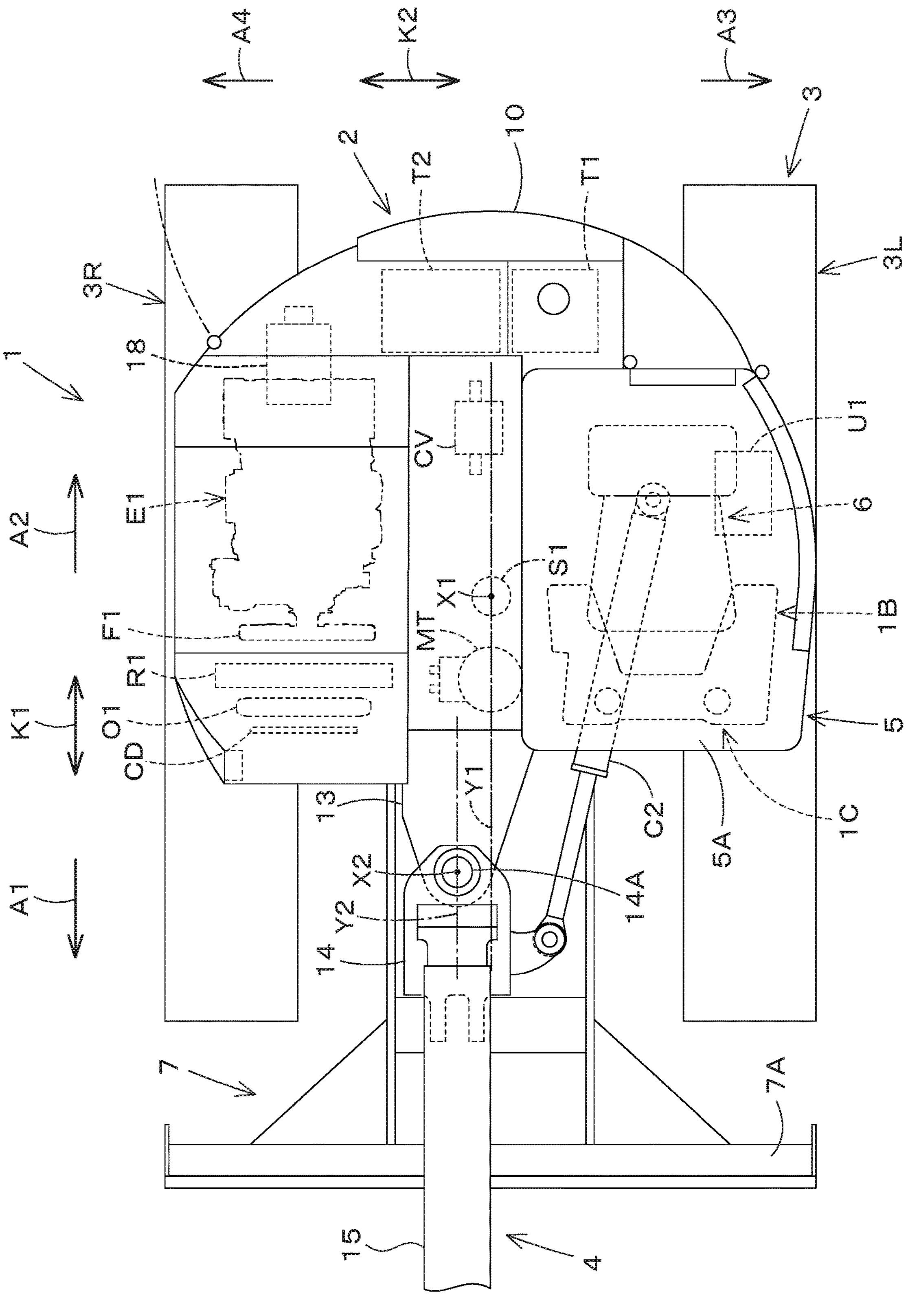
FIG. 2 is a plan view of the working machine.

FIG. 1 a schematic side view of the overall configuration of a working machine 1 according to the first embodiment. FIG. 2 is a schematic plan view of the working machine 1. In the present embodiment, a backhoe, which is a slewable working machine, is described as an example of the working machine 1.

As illustrated in FIG. 1 and FIG. 2, the working machine 1 includes a machine body (a slewing base) 2, a traveling device 3, and a working device 4. A cabin 5 is mounted on the machine body 2. An operator's seat 6 at which an operator (a driver) sits is disposed inside the cabin 5.

In the present embodiment, a direction toward the front of an operator sitting at the operator's seat 6 of the working machine 1 (the direction of arrow A1 in FIG. 1 and FIG. 2) will be defined as forward (toward the front of the machine body 2), and a direction toward the rear of the operator (the direction of arrow A2 in FIG. 1 and FIG. 2) will be defined as rearward (toward the rear of the machine body 2). In FIG. 1 and FIG. 2, the longitudinal direction (a machine-body depth direction) is indicated by arrows K1. In addition, a direction toward the left of the operator (the near side in FIG. 1, the direction of arrow A3 in FIG. 2) will be defined as leftward, and a direction toward the right of the operator (the far side in FIG. 1, the direction of arrow A4 in FIG. 2) will be defined as rightward. The horizontal direction, which is a direction perpendicular to the longitudinal direction (the machine-body depth direction) K1 will be referred to as a machine-body width direction K2 (see FIG. 2).

As illustrated in FIG. 1 and FIG. 2, the traveling device 3 is a device that is capable of traveling and that supports the machine body 2. The traveling device 3 includes a traveling frame 3A, a first traveling device 3L provided on the left-hand side of the traveling frame 3A, and a second traveling device 3R provided on the right-hand side of the traveling frame 3A. The first traveling device 3L and the second traveling device 3R are crawler-type traveling devices. The traveling device 3 is driven by a traveling motor M1 that is a hydraulic motor (a hydraulic actuator). More specifically, the first traveling device 3L is driven by a first traveling motor ML, and the second traveling device 3R is driven by a second traveling motor MR.

A dozer device 7 is mounted on the front of the traveling device 3. The dozer device 7 is driven by a dozer cylinder C1. More specifically, the dozer cylinder C1 is a hydraulic cylinder (a hydraulic actuator), and a blade 7A of the dozer device 7 is raised and lowered by expansion and contraction of the dozer cylinder C1.

As illustrated in FIG. 1, the machine body 2 is supported on the traveling device 3 (the traveling frame 3A) with a slewing bearing 8 interposed therebetween such that the machine body 2 is turnable around a turning axis X1. The turning axis X1 is an axis (a vertical axis) that vertically extends in such a manner as to pass through the center of the slewing bearing 8.

As illustrated in FIG. 2, the cabin 5 is mounted on a portion of the machine body 2 on one side (the left-hand side) in the machine-body width direction K2. The cabin 5 is located on one side (the left-hand side) of a center line Y1 in the machine-body width direction K2, the center line Y1 extending in the longitudinal direction K1 in such a manner as to pass through the turning axis X1.

As illustrated in FIG. 2, a prime mover E1 is mounted on a portion of the machine body 2 on the other side (the right-hand side) in the machine-body width direction K2. The prime mover E1 is vertically mounted on the machine body 2. The phrase "vertically mounted" refers to being mounted such that a crankshaft of the prime mover E1 extends in the longitudinal direction K1. The prime mover E1 is a diesel engine. Note that the prime mover E1 may be a gasoline engine or an electric motor or may be a hybrid prime mover that includes an engine and an electric motor.

A pressure-oil supply unit 18 is mounted on the rear of the prime mover E1. The pressure-oil supply unit 18 is driven by the power of the prime mover E1 so as to pressurize and deliver a hydraulic fluid that is used by a hydraulic driving unit. The hydraulic driving unit is, for example, a hydraulic actuator or the like installed in the working machine 1. A radiator R1, an oil cooler O1, and a condenser CD are arranged at forward positions with respect to the prime mover E1 and mounted on the machine body 2. The radiator R1 is a cooling device that cools cooling water (a fluid) of the prime mover E1, and the oil cooler O1 is a cooling device that cools a hydraulic fluid (a fluid). The condenser CD is a cooling device (a condenser) that cools refrigerant (a fluid) of an air conditioner installed in the working machine 1.

A cooling fan F1 that generates cooling air for cooling the prime mover E1 is disposed between the radiator R1 and the prime mover E1. The cooling fan F1 is driven by the power of the prime mover E1 and generates the cooling air that flows rearward.

As illustrated in FIG. 1, the machine body 2 includes a board (hereinafter referred to as "slewing board") 9 that is turnable around the turning axis X1. The slewing board 9 is formed of a steel plate or the like and forms a bottom portion of the machine body 2. A vertical rib 9A, which is a reinforcing member, is provided on the upper surface of the slewing board 9 in such a manner as to extend from a front portion to a rear portion of the slewing board 9. In addition to the vertical rib 9A, members and the like that are used for supporting equipment and so forth mounted on the machine body 2 are provided on the slewing board 9, so that a slewing frame that serves as a framework of the machine body 2 is formed. The peripheral area of the slewing frame in the horizontal direction is covered with a slewing cover.

A weight 10 is disposed on a rear portion of the machine body 2. The weight 10 is positioned at the rear of the machine body 2, and a lower portion of the weight 10 is attached to the slewing board 9.

As illustrated in FIG. 2, a fuel tank T1 and a hydraulic-fluid tank T2 are mounted on the rear portion of the machine body 2 in such a manner as to be arranged next to each other in the machine-body width direction K2. The fuel tank T1 is a tank that stores fuel for the prime mover E1. The hydraulic-fluid tank T2 is a tank that stores a hydraulic fluid.

As illustrated in FIG. 2, a slewing motor MT is disposed in such a manner as to be positioned at the front of the slewing board 9 (the machine body 2) and at the center of the slewing board 9 (the machine body 2) in the machine-body width direction K2. The slewing board 9 is driven by the slewing motor MT so as to turn around the turning axis X1. The slewing motor MT is a hydraulic motor (a hydraulic actuator). A swivel joint S1 is provided at the position of the turning axis X1. The swivel joint S1 is a hydraulic unit that circulates a hydraulic fluid and is a rotary joint that causes a hydraulic fluid to flow between a hydraulic unit included in the machine body 2 and a hydraulic unit included in the traveling device 3. A control valve (a hydraulic unit) CV is disposed at a rearward position with respect to the swivel joint S1. The control valve CV is a sectional-type multi-control valve (a hydraulic unit) that includes a plurality of control valves stacked on top of one another in the vertical direction and coupled to one another. A controller U1 is disposed below the cabin 5.

An operating apparatus 1B that operates the working machine 1 is installed in the cabin 5. The operating apparatus 1B is disposed at a forward position with respect to the operator's seat 6. The operator's seat 6 and the operating apparatus 1B form an operating section 1C.

As illustrated in FIG. 2, the machine body 2 includes a support bracket 13 that is provided at the front of the machine body 2 in such a manner as to be slightly offset rightward from the center of the machine body 2 in the machine-body width direction K2. The support bracket 13 is fixed to the front of the vertical rib 9A and disposed so as to project forward from the machine body 2.

As illustrated in FIG. 1 and FIG. 2, a swing bracket 14 is attached to a front portion (a portion projecting from the machine body 2) of the support bracket 13 via a swing shaft 14A so as to be swingable around a swinging axis X2, which is an axis that extends in the vertical direction. Accordingly, the swing bracket 14 is rotatable in the machine-body width direction K2 (is horizontally pivotable around the swing shaft 14A).

As illustrated in FIG. 1, a working device 4 is supported on the swing bracket 14 (the machine body 2).

The working device 4 includes a boom 15 that is supported on the machine body 2 so as to be vertically swingable (so as to be capable of swinging in the vertical direction), an arm 16 that is pivotally supported and connected to the boom 15 so as to be swingable, and a working tool (a bucket) 17 that is pivotally supported and connected to the arm 16 so as to be swingable.

A base portion of the boom 15 is pivotally supported on an upper portion of the swing bracket 14 via a pivot shaft. More specifically, the base portion of the boom 15 is attached to the upper portion of the swing bracket 14 so as to be pivotable around a horizontal axis (an axis extending in the machine-body width direction K2) in a state where the boom 15 is oriented in a direction toward an area in front of the machine body 2. This enables the boom 15 to swing in the vertical direction.

The arm 16 is pivotally supported to an end of the boom 15 via a pivot shaft. More specifically, the arm 16 is attached to the boom 15 so as to be pivotable around a horizontal axis in a state where the boom 15 is oriented in the direction toward the area in front of the machine body 2. This enables the arm 16 to swing in the longitudinal direction K1 or the vertical direction. In addition, the arm 16 is swingable in an arm-crowd direction D1 that is a direction toward the boom 15 and an arm-dump direction D2 that is a direction away from the boom 15.

The working tool 17 is pivotally attached to an end of the arm 16 via a pivot shaft. More specifically, the working tool 17 is attached to the arm 16 so as to be pivotable around a horizontal axis in a state where the boom 15 is oriented in the direction toward the area in front of the machine body 2. This enables the working tool 17 to swing in a direction toward the arm 16 (a bucket-crowd direction) and a direction away from the arm 16 (a bucket-dump direction). The bucket serving as the working tool 17 is attached to the arm 16 so as to be capable of performing a shoveling operation and a dumping operation. The shoveling operation is an operation of causing the working tool 17 to swing in the direction toward the boom 15 and is, for example, an operation of scooping earth and sand or the like. The dumping operation is an operation of causing the working tool 17 to swing in the direction away from the boom 15 and is, for example, an operation of dropping (discharging) scooped earth and sand or the like.

Note that, instead of the bucket, a working tool (an attachment) such as a pallet fork or a manure fork or a working tool (a hydraulic attachment) that includes a hydraulic actuator such as a grapple, a hydraulic crusher, an angle broom, an earth auger, a snow blower, a sweeper, a mower, or a hydraulic breaker may be attached to the arm 16.

Expansion and contraction of a swing cylinder C2 that is included in the machine body 2 enables the swing bracket 14 to swing. Expansion and contraction of a boom cylinder C3 enables the boom 15 to vertically swing. Expansion and contraction of an arm cylinder C4 enables the arm 16 to swing in the arm-crowd direction D1 and the arm-dump direction D2. Expansion and contraction of a working-tool cylinder (a bucket cylinder) C5 enables the working tool 17 to swing in the bucket-crowd direction and the bucket-dump direction. The swing cylinder C2, the boom cylinder C3, the arm cylinder C4, and the working-tool cylinder C5 are hydraulic cylinders (hydraulic actuators).

A hydraulic system for actuating various hydraulic actuators ML, MR, MT, and C1 to C6 that are included in the working machine 1 will now be described with reference to FIG. 3 to FIG. 7.

Figure 3:
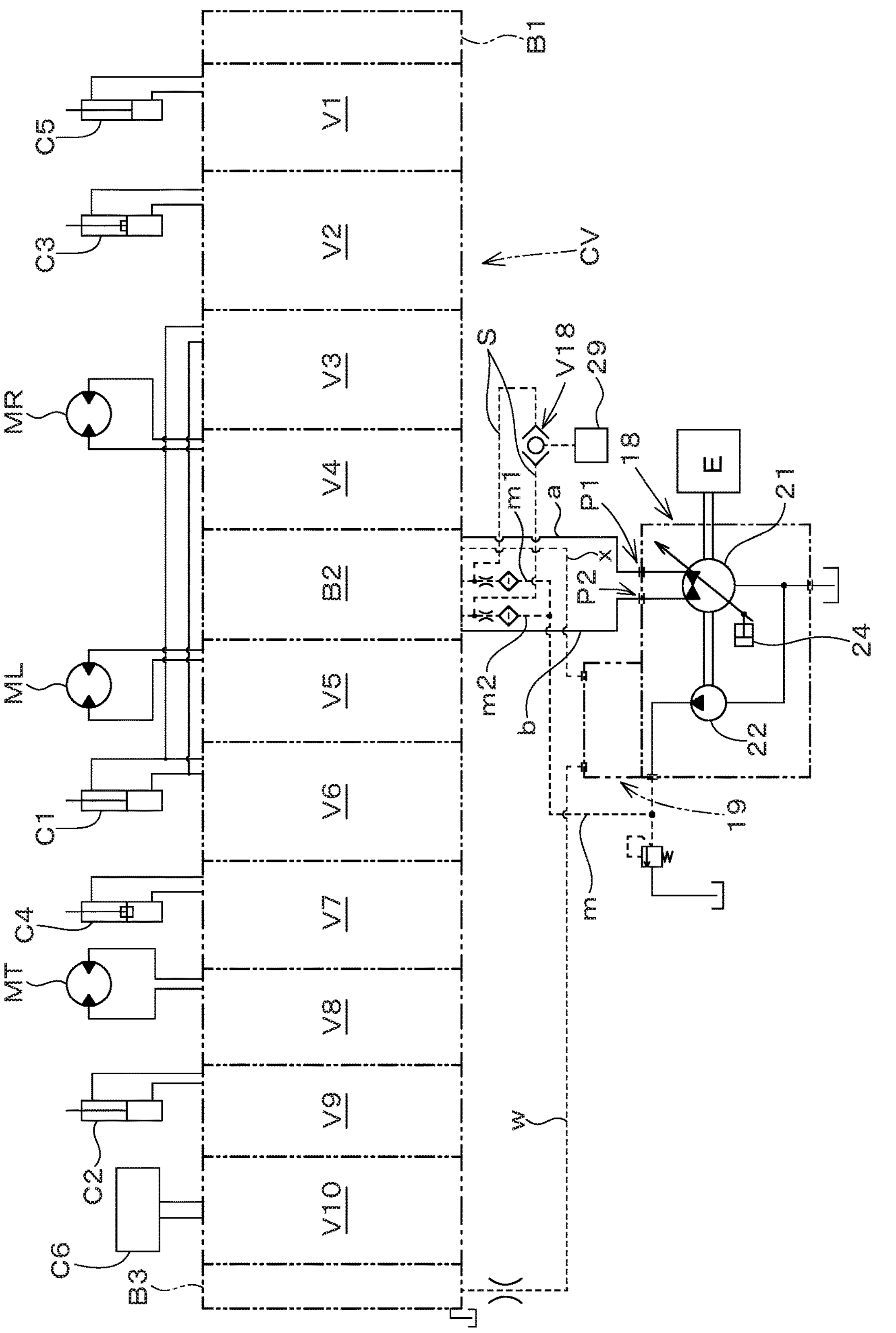
FIG. 3 is a schematic diagram of a hydraulic system.

As illustrated in FIG. 3, the hydraulic system includes the control valve CV, the pressure-oil supply unit 18, and a flow-rate control unit 19. The control valve CV is an aggregate of control valves V1 to V10 that control the various hydraulic actuators ML, MR, MT, and C1 to C6, an inlet block B2 for taking in pressure oil, and a pair of outlet blocks B1 and B3 for discharging pressure oil arranged in one direction.

As illustrated in FIG. 3, in the control valve CV in the present embodiment, the first outlet block B1, the working-tool control valve V1 that controls the working-tool cylinder C5, the boom control valve V2 that controls the boom cylinder C3, the dozer first control valve V3 that controls the dozer cylinder C1, the second traveling control valve V4 that controls the traveling motor MR of the second traveling device 3R, the inlet block B2, the first traveling control valve V5 that controls the traveling motor ML of the first traveling device 3L, the dozer second control valve V6 that controls the dozer cylinder C1, the arm control valve V7 that controls the arm cylinder C4, the slew control valve V8 that controls the slewing motor MT, the swing control valve V9 that controls the swing cylinder C2, the SP control valve V10 that controls the attachment actuator (a hydraulic actuator) C6 included in a hydraulic attachment attached as the working tool 17, and the second outlet block B3 are arranged in this order (starting from the right-hand side in FIG. 3) and connected to one another.

As illustrated in FIG. 4 to FIG. 7, each of the control valves V1 to V10 includes a corresponding one of direction switching valves DV1 to DV10 and a pressure compensation valve (a compensator valve) V11 incorporated in its valve body. The direction switching valves DV1 to DV10 are valves that switch a flow direction of the hydraulic fluid with respect to the hydraulic actuators ML, MR, MT, and C1 to C6, which are control targets. In a direction in which the pressure oil is supplied, the pressure compensation valves V11 are disposed downstream from the direction switching valves DV1 to DV10 and upstream from the hydraulic actuators ML, MR, MT, and C1 to C6, which are control targets. The pressure compensation valves V11 function as adjusters for the loads among the hydraulic actuators ML, MR, MT, and C1 to C6 when two or more of the control valves V1 to V10 are used.

A first relief valve V12 and a first unloading valve V13 are incorporated in the first outlet block B1, and a traveling independent valve V14 is incorporated in the inlet block B2. The first relief valve V12 is a main relief valve that regulates the pressure of the hydraulic fluid delivered from a first pressure-oil delivery port P1, which will be described later.

The traveling independent valve V14 is a direct-acting spool switching valve and a pilot-operated switching valve that is switch-operated by a pilot control pressure.

A second relief valve V15 and a second unloading valve V16 are incorporated in the second outlet block B3. The second relief valve V15 is a main relief valve that regulates the pressure of the hydraulic fluid delivered from a second pressure-oil delivery port P2, which will be described later.

The direction switching valves DV1 to DV10 are direct-acting spool switching valves. In addition, the direction switching valves DV1 to DV10 are control valves that are electrically controlled by the controller U1. More specifically, for example, pilot-operated proportional solenoid valves are used as the direction switching valves DV1 to DV10. A pilot-operated proportional solenoid valve is a valve that controls the flow direction and the flow rate of a hydraulic fluid as a result of its spool being moved by a pilot control pressure, which is controlled by a proportional solenoid. More specifically, a pilot-operated proportional solenoid valve is a two-stage directional and flow control valve that employs a proportional solenoid pressure reducing valve with two proportional solenoids in a pilot portion. The flow rate is controlled by changing a current that is input to the proportional solenoids, and the flow direction is controlled by applying a current to one of the two proportional solenoids.

Figure 4:
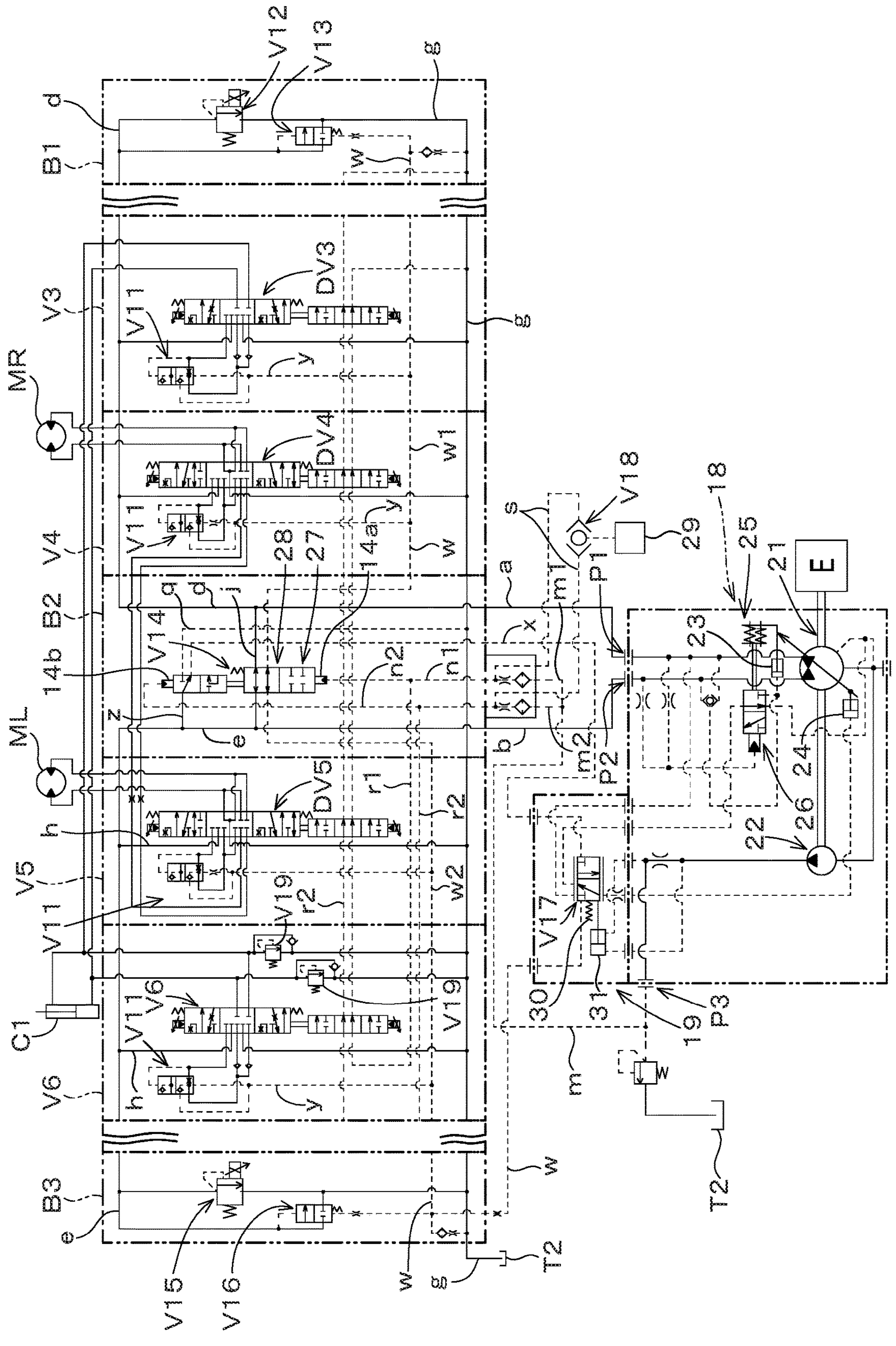
FIG. 4 is a circuit diagram of part of the hydraulic system.
Figure 5:
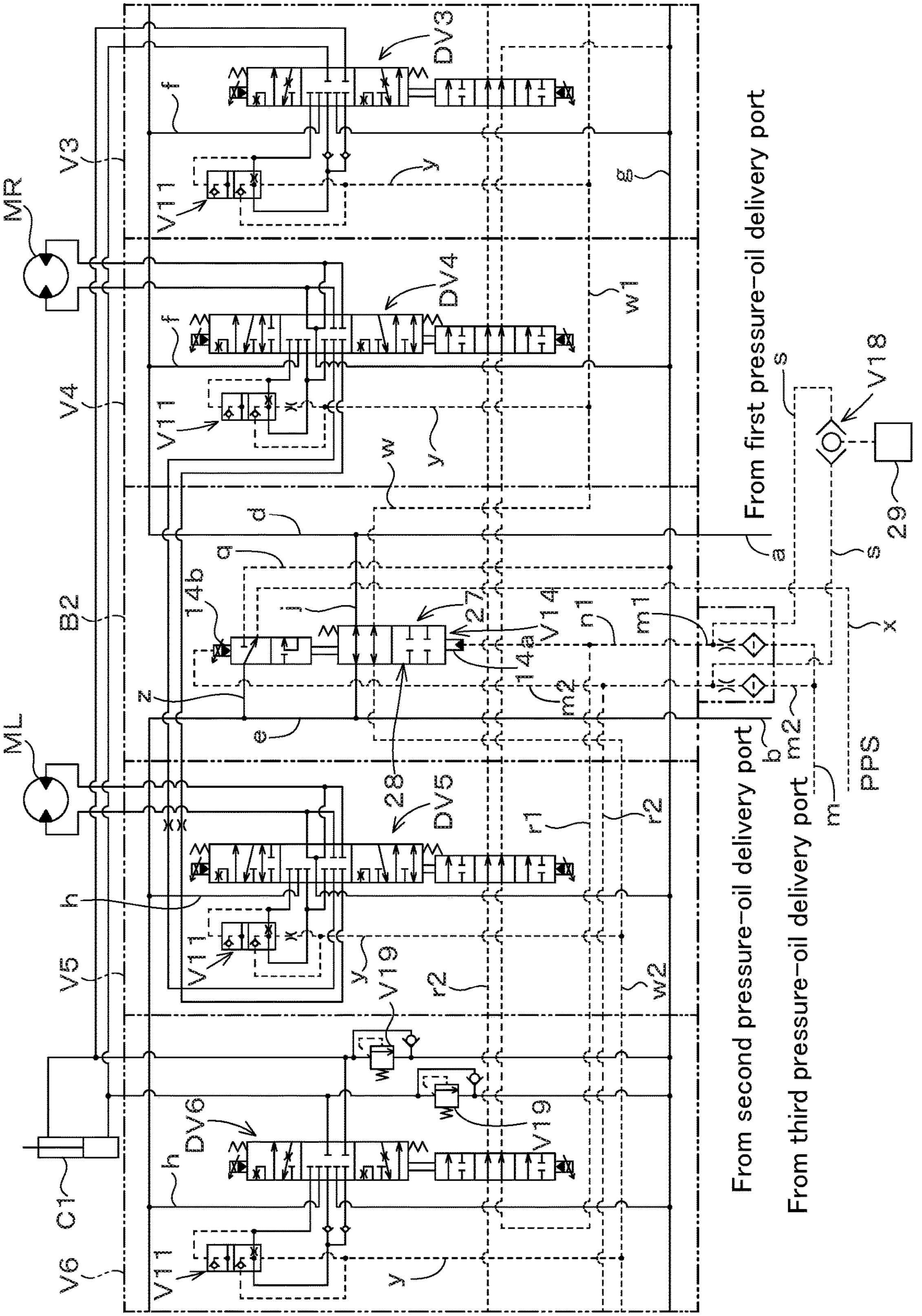
FIG. 5 is a circuit diagram of a portion of a control valve.
Figure 6:
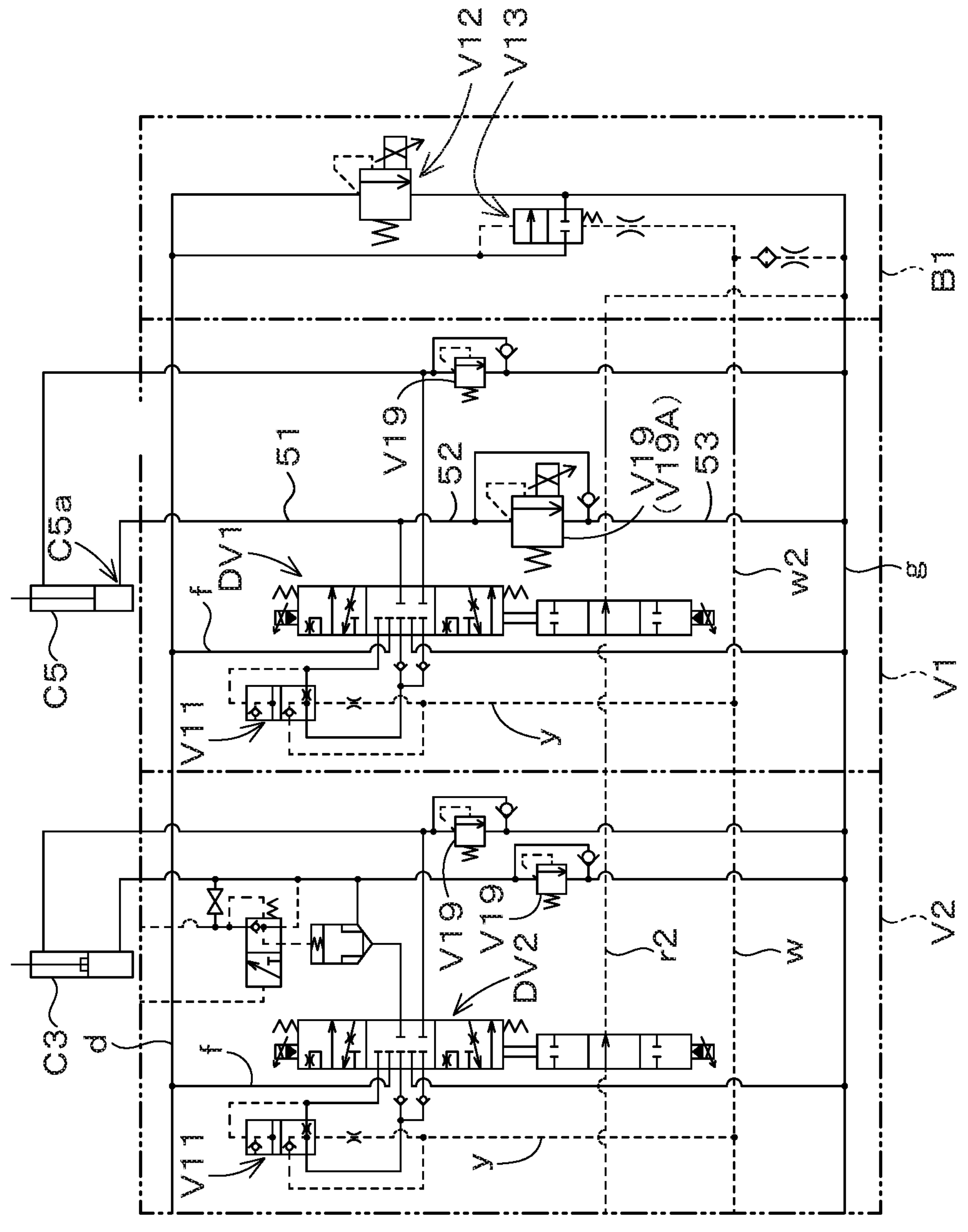
FIG. 6 is a circuit diagram of another portion of the control valve.
Figure 7:
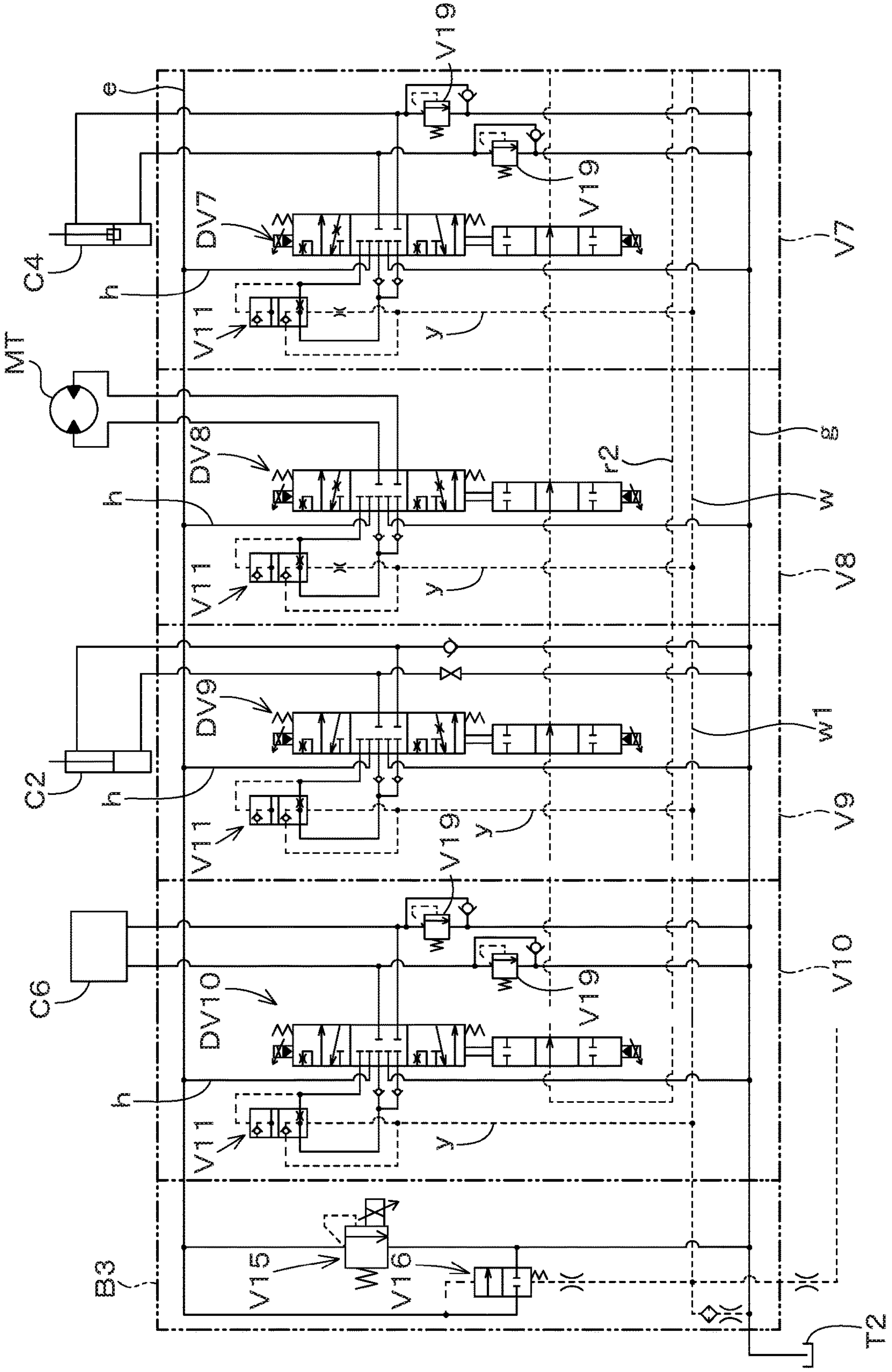
FIG. 7 is a circuit diagram of another portion of the control valve.

As illustrated in FIG. 4, the hydraulic system includes, as pressure-oil supply sources, a first pump 21 that supplies a hydraulic fluid for actuating the hydraulic actuators ML, MR, MT, and C1 to C6 and a second pump 22 for supplying a signal pressure oil such as a pilot control pressure or a detection signal. The first pump 21 and the second pump 22 are included in the pressure-oil supply unit 18 and driven by the prime mover E1.

The first pump 21 is a variable displacement pump, and in the present embodiment, the first pump 21 is a swash-plate variable displacement axial pump that has a function of an equal-flow-rate double pump that delivers the hydraulic fluid through the two independent pressure-oil delivery ports P1 and P2 such that the amount of the hydraulic fluid delivered through the pressure-oil delivery port P1 is equal to that delivered through the pressure-oil delivery port P2. More specifically, a split-flow hydraulic pump having a mechanism that delivers a hydraulic fluid from a single piston cylinder barrel kit alternately to delivery grooves formed inside and outside a valve plate is used as the first pump 21.

One of the pressure-oil delivery ports of the first pump 21 through which the hydraulic fluid is delivered will be referred to as the first pressure-oil delivery port P1, and the other of the pressure-oil delivery ports will be referred to as the second pressure-oil delivery port P2.

Note that, in the present embodiment, although the hydraulic pump having two pumping functions has the first and second pressure-oil delivery ports P1 and P2 through which the hydraulic fluid is delivered, a configuration may be employed in which one of two independent hydraulic pumps has the first pressure-oil delivery port P1 and in which the other of the two independent hydraulic pumps has the second pressure-oil delivery port P2.

The pressure-oil supply unit 18 includes a pressing piston 23 that presses a swash plate of the first pump 21 and a flow-rate compensation piston 24 that controls the swash plate of the first pump 21.

The first pump 21 is configured such that the self-pressure of the first pump 21 presses, through the pressing piston 23, the swash plate in a direction in which the pumping flow rate is increased and that the flow-rate compensation piston 24 applies a force that resists the pressing force of the pressing piston 23 to the swash plate, and the delivery flow rate of the first pump 21 is controlled by controlling the pressure exerted on the flow-rate compensation piston 24.

Accordingly, when the pressure exerted on the flow-rate compensation piston 24 is released, the angle of the swash plate becomes maximum, and the delivery flow rate of the first pump 21 becomes maximum.

As illustrated in FIG. 4, the flow-rate control unit 19 controls the swash plate of the first pump 21 by controlling the pressure exerted on the flow-rate compensation piston 24, and the pressure exerted on the flow-rate compensation piston 24 is controlled by opening and closing a flow-rate compensation valve V17 that is included in the flow-rate control unit 19.

The pressure-oil supply unit 18 further includes a spring 25 and a spool 26 that control the pump horsepower (torque). When the delivery pressure of the first pump 21 becomes a predetermined pressure, the first pump 21 limits the horsepower (torque) received from the prime mover E1.

The second pump 22 is a fixed displacement gear pump and delivers oil through a third pressure-oil delivery port P3.

The first pressure-oil delivery port P1 is connected to the inlet block B2 via a first delivery path a, and the second pressure-oil delivery port P2 is connected to the inlet block B2 via a second delivery path b.

The first delivery path a is connected to a first pressure-oil supply path d. The first pressure-oil supply path d is formed in such a manner as to extend from the inlet block B2 to the first outlet block B1 through the valve body of the second traveling control valve V4, the valve body of the dozer first control valve V3, the valve body of the boom control valve V2, and the valve body of the working-tool control valve V1 and branches at the first outlet block B1 (at the end of a flow path) so as to be connected to the first relief valve V12 and the first unloading valve V13.

The hydraulic fluid can be supplied to the direction switching valve DV4 of the second traveling control valve V4, the direction switching valve DV3 of the dozer first control valve V3, the direction switching valve DV2 of the boom control valve V2, and the direction switching valve DV1 of the working-tool control valve V1 through the first pressure-oil supply path d and pressure-oil branch paths f.

The first relief valve V12 and the first unloading valve V13 are connected to a drain fluid passage g. The drain fluid passage g is formed in such a manner as to extend from the first outlet block B1 to the second outlet block B3 through the valve body of the working-tool control valve V1, the valve body of the boom control valve V2, the valve body of the dozer first control valve V3, the valve body of the second traveling control valve V4, the inlet block B2, the valve body of the first traveling control valve V5, the valve body of the dozer second control valve V6, the valve body of the arm control valve V7, the valve body of the slew control valve V8, the valve body of the swing control valve V9, and the valve body of the SP control valve V10. The hydraulic fluid that flows through the drain fluid passage g is discharged from the second outlet block B3 to the hydraulic-fluid tank T2.

The second delivery path b is connected to a second pressure-oil supply path e. The second pressure-oil supply path e is formed in such a manner as to extend from the inlet block B2 to the second outlet block B3 through the valve body of the first traveling control valve V5, the valve body of the dozer second control valve V6, the valve body of the arm control valve V7, the valve body of the slew control valve V8, the valve body of the swing control valve V9, and the valve body of the SP control valve V10 and branches at the second outlet block B3 (at the end of a flow path) so as to be connected to the second relief valve V15 and the second unloading valve V16.

The hydraulic fluid can be supplied to the direction switching valve DV5 of the first traveling control valve V5, the direction switching valve DV6 of the dozer second control valve V6, the direction switching valve DV7 of the arm control valve V7, the direction switching valve DV8 of the slew control valve V8, the direction switching valve DV9 of the swing control valve V9, and the direction switching valve DV10 of the SP control valve V10 through the second pressure-oil supply path e and pressure-oil branch paths h.

The hydraulic fluid supplied to the control valves V1 to V10 is supplied and discharged to and from the hydraulic actuators ML, MR, MT, and C1 to C6. In other words, the hydraulic system includes a hydraulic circuit for supplying and discharging the hydraulic fluid to and from the hydraulic actuators ML, MR, MT, and C1 to C6.

The second relief valve V15 and the second unloading valve V16 are connected to the drain fluid passage g.

In the inlet block B2, the first pressure-oil supply path d and the second pressure-oil supply path e are connected to each other by a communication path j that extends across the traveling independent valve V14.

The traveling independent valve V14 is freely switchable between an independent position 27 in which the traveling independent valve V14 blocks the flow of the pressure oil through the communication path j and a merging position 28 in which the traveling independent valve V14 allows the flow of the pressure oil through the communication path j.

When the traveling independent valve V14 has been switched to be in the independent position 27, the hydraulic fluid from the first pressure-oil delivery port P1 can be supplied to the direction switching valve DV4 of the second traveling control valve V4 and the direction switching valve DV3 of the dozer first control valve V3, and the hydraulic fluid from the second pressure-oil delivery port P2 can be supplied to the direction switching valve DV5 of the first traveling control valve V5 the direction switching valve DV6 of the dozer second control valve V6. On the other hand, the hydraulic fluid from the first pressure-oil delivery port P1 is not supplied to either the first traveling control valve V5 or the dozer second control valve V6, and the hydraulic fluid from the second pressure-oil delivery port P2 is not supplied to either the second traveling control valve V4 or the dozer first control valve V3.

When the traveling independent valve V14 is switched to be in the merging position 28, the hydraulic fluid from the first pressure-oil delivery port P1 and the hydraulic fluid from the second pressure-oil delivery port P2 are merged and can be supplied to the direction switching valves DV1 to DV10 of the control valves V1 to V10.

The third pressure-oil delivery port P3 is connected to the inlet block B2 by a third delivery path m, and the third delivery path m branches into a first branch fluid passage m1 and a second branch fluid passage m2 at a position partway along its length and is connected to the inlet block B2.

The first branch fluid passage m1 is connected to a pressure receiver 14*a* located on one side of the traveling independent valve V14 by a first signal fluid passage n1, and the second branch fluid passage m2 is connected to a pressure receiver 14*b* located on the other side of the traveling independent valve V14 by a second signal fluid passage n2.

A first detection fluid passage r1 is connected to the first signal fluid passage n1, and a second detection fluid passage r2 is connected to the second signal fluid passage n2.

The first detection fluid passage r is connected to the drain fluid passage g via the first signal fluid passage n1, the direction switching valve DV6 of the dozer second control valve V6, the direction switching valve DV5 of the first traveling control valve V5, the direction switching valve DV4 of the second traveling control valve V4, and the direction switching valve DV3 of the dozer first control valve V3.

The second detection fluid passage r2 is connected to the drain fluid passage g via the second signal fluid passage n2, the direction switching valve DV10 of the SP control valve V10, the direction switching valve DV9 of the swing control valve V9, the direction switching valve DV8 of the slew control valve V8, the direction switching valve DV7 of the arm control valve V7, the direction switching valve DV6 of the dozer second control valve V6, the direction switching valve DV5 of the first traveling control valve V5, the direction switching valve DV4 of the second traveling control valve V4, the direction switching valve DV3 of the dozer first control valve V3, the direction switching valve DV2 of the boom control valve V2, and the direction switching valve DV1 of the working-tool control valve V1.

When the direction switching valves DV1 to DV10 of the control valves V1 to V10 are each in a neutral position, the traveling independent valve V14 is held in the merging position 28 by a spring force.

When any one of the direction switching valves DV3 to DV6 of the second traveling control valve V4, the first traveling control valve V5, the dozer first control valve V3, and the dozer second control valve V6 is operated to move from the neutral position, pressure is applied to the first detection fluid passage r1 and the first signal fluid passage n1, so that the traveling independent valve V14 is switched from the merging position 28 to the independent position 27.

Thus, in the case of only traveling, in the case of using the dozer device 7 while traveling, or in the case of only using the dozer device 7, the hydraulic fluid from the first pressure-oil delivery port P1 is supplied to the direction switching valve DV4 of the second traveling control valve V4 and the direction switching valve DV3 of the dozer first control valve V3, and the hydraulic fluid from the second pressure-oil delivery port P2 is supplied to the direction switching valve DV5 of the first traveling control valve V5 and the direction switching valve DV3 of the dozer first control valve V3.

In this case, when any one of the direction switching valve DV10 of the SP control valve V10, the direction switching valve DV9 of the swing control valve V9, the direction switching valve DV8 of the slew control valve V8, the direction switching valve DV7 of the arm control valve V7, the direction switching valve DV2 of the boom control valve V2, and the direction switching valve DV1 of the working-tool control valve V1 is operated to move from the neutral position, pressure is applied to the second detection fluid passage r2 and the second signal fluid passage n2, so that the traveling independent valve V14 is switched from the independent position 27 to the merging position 28.

In addition, from the state where the direction switching valves DV1 to DV10 of the control valves V1 to V10 are in their neutral positions, when any one of the direction switching valve DV10 of the SP control valve V10, the direction switching valve DV9 of the swing control valve V9, the direction switching valve DV8 of the slew control valve V8, the direction switching valve DV7 of the arm control valve V7, the direction switching valve DV2 of the boom control valve V2, and the direction switching valve DV1 of the working-tool control valve V1 is operated to move from the neutral position, the traveling independent valve V14 is in the merging position 28.

Thus, when the working machine 1 is not traveling or when the working machine 1 is traveling, simultaneous operations of the boom 15, the arm 16, the working tool 17, the swing bracket 14, the machine body 2, and the dozer device 7 can be performed.

The hydraulic system further includes an automatic idling control system (an A1 system) that automatically operates an accelerator of the prime mover E1.

The AI system includes an AI switch (a pressure switch) 29 that is connected to the first branch fluid passage m1 and the second branch fluid passage m2 of the third delivery path m via a sensing fluid passage s and a shuttle valve V18, an electrical actuator that controls a governor of the prime mover E1, and a controller that controls the electrical actuator. The AI switch 29 is connected to the controller.

In the AI system, pressure is not applied to either the first branch fluid passage m1 or the second branch fluid passage m2 when the direction switching valves DV1 to DV10 of the control valves V1 to V10 are in their neutral positions. Thus, the AI switch 29 is not pressure-activated, and in this state, the governor is automatically controlled by the electric actuator or the like so as to be accelerated down to a predetermined idling position.

When at least one of the direction switching valves DV1 to DV10 of the control valves V1 to V10 is operated, pressure is applied to the first branch fluid passage m1 or the second branch fluid passage m2, and this pressure is detected by the AI switch 29, so that the AI switch 29 is pressure-activated. Then, the controller transmits a command signal to the electrical actuator or the like, and the governor is automatically controlled by the electric actuator or the like so as to be accelerated up to a predetermined accelerator position.

In addition, the hydraulic system employs a load sensing system.

The load sensing system of the present embodiment includes the pressure compensation valves V11 included in the control valves V1 to V10, the flow-rate compensation piston 24, which controls the swash plate of the first pump 21, the flow-rate compensation valve V17, which is included in the flow-rate control unit 19, the first and second relief valves V12 and V15, and the first and second unloading valves V13 and V16. In addition, as the load sensing system of the present embodiment, an after-orifice type load sensing system in which the pressure compensation valves V11 are disposed downstream from the direction switching valves DV1 to DV10 in the direction in which the pressure oil is supplied is employed.

In the load sensing system, when two or more of the hydraulic actuators ML, MR, MT, and C1 to C6 included in the working machine 1 are simultaneously operated, the pressure compensation valves V11 function as adjusters for the loads among the hydraulic actuators ML, MR, MT, and C1 to C6 so as to generate a pressure loss at each of the control valves V1 to V10 on a low load pressure side, the pressure loss being equivalent to the differential pressure from the highest load pressure. As a result, the hydraulic fluid can flow (can be distributed) at a flow rate according to the operating amount of the spool of each of the direction switching valves DV1 to DV10 regardless of the magnitude of the load. In other words, the load sensing system controls the first pump 21 such that the differential pressure obtained by subtracting the highest load pressure among the load pressures of the plurality of hydraulic actuators ML, MR, MT, and C1 to C6 from the delivery pressure of the first pump 21 is kept constant.

In addition, the load sensing system controls the delivery amount of the first pump 21 in accordance with the load pressures of the hydraulic actuators ML, MR, MT, and C1 to C6 included in the working machine 1 so as to cause a hydraulic power required for load to be delivered from the first pump 21, so that power saving and operability can be improved.

Further details of the load sensing system of the present embodiment will now be described below.

The load sensing system includes a PLS-signal fluid passage w that transmits the highest load pressure among the load pressures of the control valves V1 to V10 as a PLS signal pressure to the flow-rate compensation valve V17 and a PPS-signal fluid passage x that transmits the delivery pressure of the first pump 21 as a PPS signal pressure to the flow-rate compensation valve V17.

The PLS-signal fluid passage w is formed in such a manner as to extend from the first outlet block B1 to the second outlet block B3 through the valve body of the working-tool control valve V1, the valve body of the boom control valve V2, the valve body of the dozer first control valve V3, the valve body of the second traveling control valve V4, the traveling independent valve V14, the valve body of the first traveling control valve V5, the valve body of the dozer second control valve V6, the valve body of the arm control valve V7, the valve body of the slew control valve V8, the valve body of the swing control valve V9, and the valve body of the SP control valve V10. The PLS-signal fluid passage w is connected to the pressure compensation valves V11 of the control valves V1 to V10 by load transmission lines y.

In addition, the PLS-signal fluid passage w extends from the second outlet block B3 so as to be connected to one end of the spool of the flow-rate compensation valve V17, and the PPS signal pressure is applied to the one end of the spool of the flow-rate compensation valve V17.

Furthermore, the PLS-signal fluid passage w is connected to the first unloading valve V13 and the drain fluid passage g in the first outlet block B1 and connected to the second unloading valve V16 and the drain fluid passage g in the second outlet block B3.

When the traveling independent valve V14 is in the merging position 28, a line w1 of the PLS-signal fluid passage w that extends from the traveling independent valve V14 to the first outlet block B1 and a line w2 of the PLS-signal fluid passage w that extends from the traveling independent valve V14 to the second outlet block B3 communicate with each other. When the traveling independent valve V14 is switched from the merging position 28 to the independent position 27, the PLS-signal fluid passage w is cut off at the traveling independent valve V14.

As a result, when the traveling independent valve V14 is switched to the independent position 27, the PLS-signal fluid passage w is split into the line w1 along which the hydraulic fluid is supplied from the first pressure-oil delivery port P1 and the line w2 along which the pressure oil is supplied from the second pressure-oil delivery port P2.

The PPS-signal fluid passage x is formed in such a manner as to extend from the traveling independent valve V14 to the other end of the spool of the flow-rate compensation valve V17. When the traveling independent valve V14 is in the merging position 28, the PPS-signal fluid passage x communicates with the second pressure-oil supply path e via a connection fluid passage z, and the PPS signal pressure (the delivery pressure of the first pump 21) is applied to the other end of the spool of the flow-rate compensation valve V17. When the traveling independent valve V14 is switched to the independent position 27, the PPS-signal fluid passage x communicates with the drain fluid passage g via a relief fluid passage q, and the PPS signal pressure becomes zero.

Note that a spring 30 and a differential pressure piston 31 that apply a control differential pressure to the flow-rate compensation valve V17 are provided at the one end of the spool of the flow-rate compensation valve V17.

In the hydraulic system having the above-described configuration, the direction switching valves DV1 to DV10 of the control valves V1 to V10 are in their neutral positions, the traveling independent valve V14 is in the merging position 28. In this case, a flow-path end side of the first pressure-oil supply path d is blocked by the first unloading valve V13, and a flow-path end side of the second pressure-oil supply path e is blocked by the second unloading valve V16. Thus, when the delivery pressure (the PPS signal pressure) of the first pump 21 increases, and the difference between the PPS signal pressure and the PLS signal pressure (which is zero in this state) becomes larger than the control differential pressure, the flow rate of the first pump 21 is controlled so as to reduce the delivery amount of the first pump 21, and the first and second unloading valves V13 and V16 are opened such that the hydraulic fluid delivered from the first pump 21 flows into the hydraulic-fluid tank T2.

Thus, in this state, the delivery pressure of the first pump 21 is the pressures set by the first and second unloading valves V13 and V16, and the delivery flow rate of the first pump 21 is a minimum delivery amount.

Next, the case where any two or more of the boom cylinder C3, the arm cylinder C4, the working-tool cylinder C5, the swing cylinder C2, the slewing motor MT, and the hydraulic attachment are simultaneously operated, or the case where one or more of these and any one or more of the left and right traveling motors ML and MR and the dozer cylinder C1 are simultaneously operated will now be described.

In either case, the traveling independent valve V14 is in the merging position 28. The highest load pressure applied to the operated hydraulic actuators ML, MR, MT, and C1 to C6 is the PLS signal pressure, and the delivery pressure (the discharge flow rate) of the first pump 21 is automatically controlled such that the differential pressure obtained by subtracting the PLS signal pressure from the PPS signal pressure is equal to the control differential pressure (the difference between the PPS signal pressure and the PLS signal pressure is maintained at a set value).

In other words, once an unloading flow rate through the first and second unloading valves V13 and V16 has become zero, the delivery flow rate of the first pump 21 starts to increase, and all the hydraulic fluid delivered from the first pump 21 flows into the operated hydraulic actuators ML, MR, MT, and C1 to C6 in accordance with the operating amounts of the operated control valves.

The differential pressure across the spool of each of the direction switching valves DV1 to DV10 of the operated control valves V1 to V10 is kept constant by the corresponding pressure compensation valve V11, and regardless of the difference in magnitude among the loads applied to the operated hydraulic actuators ML, MR, MT, and C1 to C6, the hydraulic fluid delivered from the first pump 21 flows such that each of the hydraulic actuators ML, MR, MT, and C1 to C6 receives an amount of the hydraulic fluid that corresponds to the manipulation amount to operate the hydraulic actuator.

Note that, in the case where the flow rate required for the hydraulic actuators ML, MR, MT, and C1 to C6 exceeds the maximum delivery flow rate of the first pump 21, the hydraulic fluid delivered from the first pump 21 is distributed on a pro rata basis to the operated hydraulic actuators ML, MR, MT, and C1 to C6.

In the above case, simultaneous operations (combined operations) can be performed by an efficient system.

In the case where the dozer device 7 performs earthwork while the working machine 1 is traveling, the traveling independent valve V14 is switched to the independent position 27, and the communication path j and the PLS-signal fluid passage w are cut off by the traveling independent valve V14. In addition, the PPS-signal fluid passage x communicates with the drain fluid passage g via the relief fluid passage q, and the PPS signal pressure becomes zero.

Thus, the hydraulic fluid from the first pressure-oil delivery port P1 flows into the second traveling control valve V4 and the dozer first control valve V3 and does not flow into either the first traveling control valve V5 or the dozer second control valve V6. The hydraulic fluid from the second pressure-oil delivery port P2 flows into the first traveling control valve V5 and the dozer second control valve V6 and does not flow into either the second traveling control valve V4 or the dozer first control valve V3. In addition, since the PPS signal pressure is zero, the angle of the swash plate of the first pump 21 becomes maximum, and the first pump 21 delivers the hydraulic fluid at the maximum flow rate.

Figure 8:
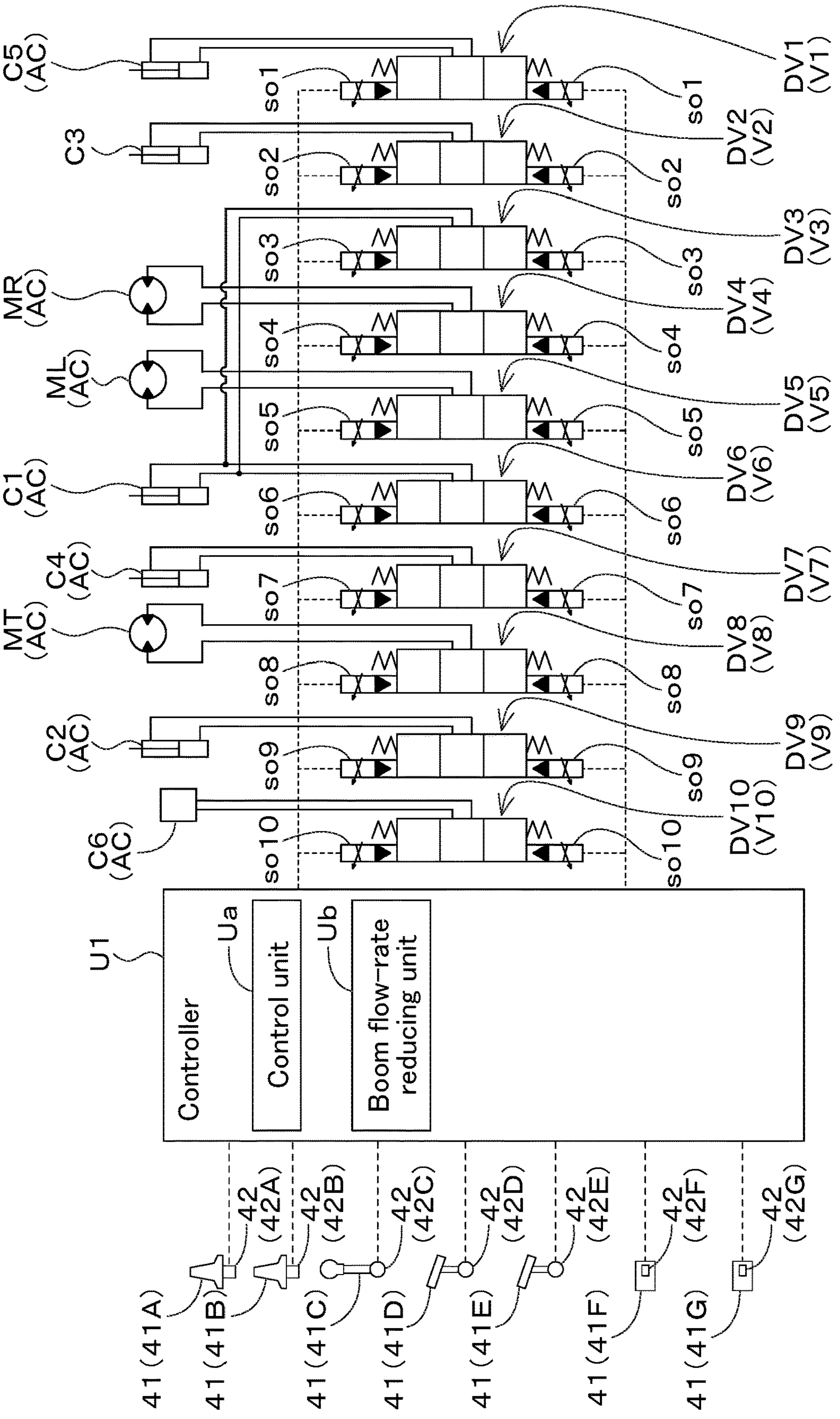
FIG. 8 is a simplified diagram of a control system according to a first embodiment.

As illustrated in FIG. 8, proportional solenoids so1 to so10 of the direction switching valves DV1 to DV10 are connected to the controller U1. The direction switching valves DV1 to DV10 (the control valves V1 to V10) are pilot-operated by pilot control pressures corresponding to control signals that are transmitted from the controller U1 to the proportional solenoids so1 to so10 (the values of currents supplied to the proportional solenoids so1 to so10) such that the flow direction and the flow rate of the hydraulic fluid with respect to the hydraulic actuators ML, MR, MT, and C1 to C6, which are control targets, are controlled. In other words, each of the control valves V1 to V10 is pilot-operated by a pilot control pressure that is controlled by a control signal transmitted by the controller U1. That is to say, each of the control valves V1 to V10 is controlled in accordance with a current supplied thereto by the controller U1.

Manipulators 41 (a first manipulator 41A to a seventh manipulator 41G) that operate the direction switching valves DV1 to DV10 (the control valves V1 to V10) are connected to the controller U1. The controller U1 supplies (transmits) currents (control signals) corresponding to the manipulation amounts of the manipulators 41 to the proportional solenoids so1 to so10 of the direction switching valves DV1 to DV10, which are operation targets.

The first manipulator 41A and the second manipulator 41B are included in the operating apparatus 1B and are each, for example, a handle that is to be held and operated by an operator who is sitting at the operator's seat 6.

The first manipulator 41A is capable of operating two of the operation targets included in the working machine 1. For example, the first manipulator 41A can operate the direction switching valve DV8 (the slewing motor MT) (can turn the machine body 2) and can operate the direction switching valve DV7 (the arm cylinder C4) (can swing the arm 16). In addition, the first manipulator 41A includes one of sensors (operation detection units) 42 (a first sensor 42A) that detects a manipulation direction and a manipulation amount. The first sensor 42A is connected to the control device U1. The controller U1 controls the slew control valve V8 (the machine body 2) and the arm control valve V7 (the arm 16) on the basis of a detection signal from the first sensor 42A.

The second manipulator 41B is also capable of operating two of the operation targets included in the working machine 1. For example, the second manipulator 41B can operate the direction switching valve DV2 (the boom cylinder C3) (can swing the boom 15) and can operate the direction switching valve DV1 (the working-tool cylinder C5) (can swing the working tool 17). In addition, the second manipulator 41B includes one of the sensors (the operation detection units) 42 (a second sensor 42B) that detects a manipulation direction and a manipulation amount. The second sensor 42B is connected to the controller U1. The controller U1 controls the boom control valve V2 (the boom 15) and the working-tool control valve V1 (the working tool 17) on the basis of a detection signal from the second sensor 42B.

The third manipulator 41C is included in the operating apparatus 1B and is, for example, a lever. The third manipulator 41C can operate the direction switching valve DV3 and the direction switching valve DV6 (the dozer cylinder C1) (can operate the dozer device 7). In addition, the third manipulator 41C includes one of the sensors (the operation detection units) 42 (a third sensor 42C) that detects a manipulation direction and a manipulation amount thereof. The third sensor 42C is connected to the controller U1. The controller U1 controls the dozer first control valve V3 and the dozer second control valve V6 (the dozer device 7) on the basis of a detection signal from the third sensor 42C.

The fourth manipulator 41D and the fifth manipulator 41E are provided on, for example, a floor portion located in front of the operator's seat 6 and are each a pedal that is operated by being stepped on by an operator.

The fourth manipulator 41D can operate the direction switching valve DV5 (the first traveling motor ML) (can operate the first traveling device 3L). In addition, the fourth manipulator 41D includes one of the sensors (the operation detection units) 42 (a fourth sensor 42D) that detects a manipulation direction and a manipulation amount thereof. The fourth sensor 42D is connected to the controller U1. The controller U1 controls the first traveling control valve V5 (the first traveling device 3L) on the basis of a detection signal from the fourth sensor 42D.

The fifth manipulator 41E can operate the direction switching valve DV4 (the second traveling motor MR) (can operate the second traveling device 3R). In addition, the fifth manipulator 41E includes one of the sensors (the operation detection units) 42 (a fifth sensor 42E) that detects a manipulation direction and a manipulation amount thereof. The fifth sensor 42E is connected to the controller U1. The controller U1 controls the second traveling control valve V4 (the second traveling device 3R) on the basis of a detection signal from the fifth sensor 42E.

The sixth manipulator 41F is, for example, a switch (such as a rocker switch or a slide switch) that is included in the first manipulator 41A or the second manipulator 41B. The sixth manipulator 41F can operate the direction switching valve DV9 (the swing cylinder C2) (can operate the swing bracket 14). In addition, the sixth manipulator 41F includes one of the sensors (the operation detection units) 42 (a sixth sensor 42F) that detects a manipulation direction and a manipulation amount thereof. The sixth sensor 42F is connected to the controller U1. The controller U1 controls the swing control valve V9 (the swing bracket 14) on the basis of a detection signal from the sixth sensor 42F.

The seventh manipulator 41G is, for example, a switch (such as a rocker switch or a slide switch) that is included in the first manipulator 41A or the second manipulator 41B. The seventh manipulator 41G can operate the direction switching valve DV10 (the hydraulic actuator of the hydraulic attachment) (can operate the hydraulic attachment serving as the working tool). In addition, the seventh manipulator 41G includes one of the sensors (the operation detection units) 42 (a seventh sensor 42G) that detects a manipulation direction and a manipulation amount thereof. The seventh sensor 42G is connected to the controller U1. The controller U1 controls the SP control valve V10 (the hydraulic attachment) on the basis of a detection signal from the seventh sensor 42G.

Although the configuration of each of the sensors 42 (the first sensor 42A to the seventh sensor 42G) is not particularly limited, for example, a potentiometer or the like may be used.

The spools of the direction switching valves DV1 to DV10 are moved in proportion to the manipulation amounts of the manipulators 41 that operate the direction switching valves DV1 to DV10 (the control valves V1 to V10), and each of the hydraulic actuators ML, MR, MT, and C1 to C6, which are control targets, receives the hydraulic fluid the amount of which is proportional to the amount of movement of a corresponding one of the direction switching valves DV1 to DV10. In other words, the operating speed of each operation target (each control target) is variable in proportion to the manipulation amount of the corresponding manipulator 41.

As described above, the control valves V1 to V10 are operated by operating the manipulators 41, and as a result, their respective the hydraulic actuators ML, MR, MT, and C1 to C6 are operated. Then, driving targets (the machine body 2, the traveling device 3, the dozer device 7, the boom 15, the arm 16, the working tool 17, and the hydraulic attachment) are driven by the hydraulic actuators ML, MR, MT, and C1 to C6.

FIG. 8 illustrates the control system according to the first embodiment.

As illustrated in FIG. 8, the controller U1 includes a control unit Ua and a boom flow-rate reducing unit Ub.

When the boom cylinder (a first hydraulic actuator) C3 is solely operated (a single operation), the control unit Ua controls a boom control valve (a first control valve) V2. In other words, when the control unit Ua operates the boom cylinder C3 on a stand-alone basis, the control unit Ua controls the boom control valve V2.

When the boom cylinder (the first hydraulic actuator) C3 and the arm cylinder (a second hydraulic actuator) C4 are simultaneously operated (combined operations), the boom flow-rate reducing unit Ub controls the boom control valve V2. In other words, when the boom control valve V2 and the arm control valve V7 are operated in combination, the boom flow-rate reducing unit Ub controls the boom control valve V2. More specifically, when the boom cylinder C3 (the boom control valve V2) is operated while the arm cylinder C4 (the arm control valve V7) is operated, the boom flow-rate reducing unit Ub controls the flow rate (a hydraulic fluid flow rate) of the hydraulic fluid that is supplied from the boom control valve V2 to the boom cylinder C3.

Figure 9:
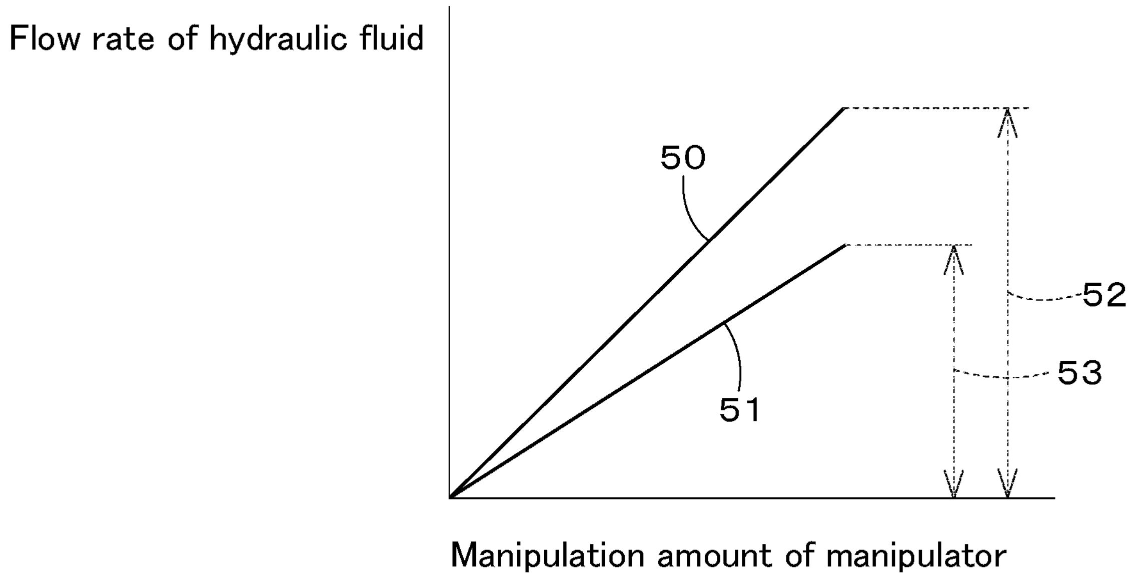
FIG. 9 is a graph illustrating a relationship between the manipulation amount of a manipulator according to the first embodiment and the flow rate of a hydraulic fluid.

FIG. 9 is a graph illustrating a relationship between the manipulation amount of one of the manipulators 41 (the second manipulator 41B) and the flow rate of the hydraulic fluid. In FIG. 9, the horizontal axis denotes the manipulation amount of the manipulator 41, and the vertical axis denotes the flow rate of the hydraulic fluid that is supplied from the boom control valve V2 to the boom cylinder C3.

In FIG. 9, a first line 50 indicates the case where the control unit Ua controls the flow rate of the hydraulic fluid supplied from the boom control valve V2 to the boom cylinder C3 with respect to the manipulation amount of the manipulator 41. In other words, the first line 50 indicates changes in the flow rate of the hydraulic fluid according to the manipulation amount to operate the boom cylinder C3 when the boom cylinder C3 is solely operated.

In FIG. 9, a second line 51 indicates the case where the boom flow-rate reducing unit Ub controls the flow rate of the hydraulic fluid supplied from the boom control valve V2 to the boom cylinder C3 with respect to the manipulation amount of the manipulator 41. In other words, the second line 51 indicates changes in the flow rate of the hydraulic fluid according to the manipulation amount to operate the boom cylinder C3 when the boom cylinder C3 and the arm cylinder C4 are operated in combination.

In FIG. 9, the reference sign 52 denotes the amount of change in the flow rate of the hydraulic fluid supplied from the boom control valve V2 to the boom cylinder C3 with respect to changes in the manipulation amount to operate the boom cylinder C3 when the boom cylinder C3 is solely operated.

In FIG. 9, the reference sign 53 denotes the amount of change in the flow rate of the hydraulic fluid supplied from the boom control valve V2 to the boom cylinder C3 with respect to changes in the manipulation amount to operate the boom cylinder C3 when the boom cylinder C3 and the arm cylinder C4 are operated in combination.

As seen from FIG. 9, the inclination of the second line 51 is smaller than that of the first line 50, and the amount of change 53 is smaller than the amount of change 52. In other words, the controller U1 performs control in such a manner that the amount of change 53 in the flow rate of the hydraulic fluid supplied from the boom control valve (the first control valve) V2 to the boom cylinder (the first hydraulic actuator) C3 with respect to changes in the manipulation amount to operate the boom cylinder (the first hydraulic actuator) C3 when the arm cylinder (the second hydraulic actuator) C4 and the boom cylinder (the first hydraulic actuator) C3 are operated in combination is smaller than the amount of change 52 in the flow rate of the hydraulic fluid supplied from the boom control valve (the first control valve) V2 to the boom cylinder (the first hydraulic actuator) C3 with respect to changes in the manipulation amount to operate the boom cylinder (the first hydraulic actuator) C3 when the boom cylinder (the first hydraulic actuator) C3 is solely operated.

In addition, as illustrated in FIG. 9, in the first embodiment, when the arm cylinder C4 and the boom cylinder C3 are operated in combination, the flow rate of the hydraulic fluid supplied from the boom control valve V2 to the boom cylinder C3 is reduced by the boom flow-rate reducing unit Ub in such a manner as to reduce the amount of change 53 to be smaller than the amount of change 52.

More specifically, it is understood from the first line 50 and the second line 51 in FIG. 9 that, in the case where the manipulation amount of the manipulator 41 (the second manipulator 41B) when the boom cylinder C3 is solely operated is the same as the manipulation amount of the manipulator 41 (the second manipulator 41B) when the arm cylinder C4 (the arm control valve V7) and the boom cylinder C3 (the boom control valve V2) are operated in combination, the flow rate of the hydraulic fluid supplied from the boom control valve V2 to the boom cylinder C3 when the arm cylinder C4 (the arm control valve V7) and the boom cylinder C3 (the boom control valve V2) are operated in combination is lower than that when the boom cylinder C3 (the boom control valve V2) is solely operated. In other words, when the arm cylinder C4 (the arm control valve V7) and the boom cylinder C3 (the boom control valve V2) are operated in combination, the flow rate of the hydraulic fluid supplied to the boom cylinder C3 with respect to the manipulation amount of the manipulator 41 (the second manipulator 41B) is reduced.

In other words, the boom flow-rate reducing unit Ub causes the hydraulic fluid to be supplied from the boom control valve V2 to the boom cylinder C3 at a flow rate lower than the flow rate of the hydraulic fluid controlled by the control unit Ua with respect to the same manipulation amount of the manipulator 41. Thus, when the boom cylinder C3 (the boom control valve V2) is operated while the arm cylinder C4 (the arm control valve V7) is operated, the boom flow-rate reducing unit Ub reduces the flow rate of the hydraulic fluid supplied from the boom control valve V2 to the boom cylinder C3. In other words, the boom flow-rate reducing unit Ub causes the hydraulic fluid to be supplied from the boom control valve V2 to the boom cylinder C3 such that the flow rate of this hydraulic fluid with respect to the manipulation amount of the manipulator 41 (the second manipulator 41B) is lower than the flow rate of the hydraulic fluid that is controlled by the control unit Ua in accordance with the same manipulation amount.

In the present embodiment, by reducing the pilot control pressure that is controlled by a control signal transmitted from the controller U1 to the boom control valve V2, the flow rate of the hydraulic fluid supplied from the boom control valve V2 to the boom cylinder C3 is reduced. In other words, the controller U1 reduces the current that is supplied to the boom control valve V2, so that the flow rate of the hydraulic fluid supplied from the boom control valve V2 to the boom cylinder C3 is reduced.

The boom 15 (the boom cylinder C3) and the arm 16 (the arm cylinder C4) are operated in combination (are simultaneously operated) when, for example, a so-called horizontal pulling control (a horizontal pulling operation) is performed. A horizontal pulling operation is an operation for leveling off the ground by moving the bucket 17 horizontally by raising the boom 15 while swinging the arm 16 in the arm-crowd direction D1 in a state where bucket teeth 17*a* (see FIG. 1) that are provided at an end of the bucket 17 are in contact with the ground. The horizontal pulling operation requires skills because the boom 15 needs to be precisely controlled. In other words, in general, when the arm 16 is moved, the balance of the machine body 2 greatly changes, which in turn results in fluctuations in the manipulation amount of the manipulator 41 (the second manipulator 41B) that operates the boom 15, and thus, skills are required. The same applies to the case of lowering the boom 15 while swinging the arm 16 in the arm-dump direction D2 in a state where the bucket teeth 17*a* at the end of the bucket 17 are in contact with the ground.

In the first embodiment, when the boom 15 is operated while the arm 16 is operated, the flow rate of the hydraulic fluid supplied from the boom control valve V2 to the boom cylinder C3 is reduced by reducing the pilot control pressure to be smaller than that when the boom 15 is solely operated, so that the raising speed of the boom 15 is slowed down, and the boom 15 can be stably operated. In addition, the horizontal movement of the bucket teeth 17*a* at the end of the bucket 17 is facilitated. As a result, the boom 15 can be easily operated in the case of raising the boom 15 while swinging the arm 16 in the arm-crowd direction D1 or in the case of lowering the boom 15 while swinging the arm 16 in the arm-dump direction D2.

In the first embodiment, for example, when a horizontal pulling operation is performed in a state where the manipulation amount to operate the boom cylinder C3 and the manipulation amount to operate the arm cylinder C4 are the same and where the speed of the arm 16 is lower than the speed of the boom 15, the boom 15 and the arm 16 can be moved harmoniously by reducing the speed of the boom 15, and a favorable horizontal pulling operation can be performed.

In addition, excessive swing of the boom 15 can be suppressed, and thus, shaking of the machine body 2 can be suppressed. Furthermore, when the boom 15 is operated while the arm 16 is operated, the flow rate of the hydraulic fluid supplied from the boom control valve V2 to the boom cylinder C3 is reduced, so that an amount of the hydraulic fluid equivalent to the reduced flow rate flows into the arm cylinder C4. As a result, the moving speed of the bucket 17 is ensured, and boom characteristics become gentle, so that the machine body 2 is stabilized. Furthermore, since the working machine 1 includes the load sensing system, intermediate flow rate characteristics are stable, and thus, even if the speed of the boom 15 is slowed down as a result of the flow rate of the hydraulic fluid being reduced by reducing the pilot control pressure, a stable operation can be performed.

Note that, in the present embodiment, when the boom cylinder C3 is operated while the arm cylinder C4 is operated, the boom flow-rate reducing unit Ub controls the boom control valve V2 so as to reduce the flow rate of the hydraulic fluid supplied from the boom control valve V2 to the boom cylinder C3. However, the present invention is not limited to this case, and the flow rate of the hydraulic fluid supplied from the boom control valve (the first control valve) V2 to the boom cylinder C3 may be reduced when the boom cylinder (the first hydraulic actuator) C3 is operated while at least one of other hydraulic actuators AC (the second hydraulic actuator) that is different from the boom cylinder (the first hydraulic actuator) C3 is operated. In other words, when the boom cylinder C3 is operated while the other hydraulic actuator AC that is different from the boom cylinder C3 is operated (when the boom cylinder C3 and the other hydraulic actuator AC, which is different from the boom cylinder C3, are operated in combination), the boom flow-rate reducing unit Ub controls the flow rate of the hydraulic fluid supplied from the boom control valve V2 to the boom cylinder C3.

The other hydraulic actuator (the second hydraulic actuator) AC, which is different from the boom cylinder (the first hydraulic actuator) C3, may be the arm cylinder C4 or may be the traveling motor M1, the slewing motor MT, the dozer cylinder C1, the swing cylinder C2, the working-tool cylinder C5, or the attachment actuator C6. Even in the case where the other hydraulic actuator AC, which is different from the boom cylinder C3, is one of the hydraulic actuators other than the arm cylinder C4, that is, one of the traveling motor M1, the slewing motor MT, the dozer cylinder C1, the swing cylinder C2, the working-tool cylinder C5, and the attachment actuator C6, advantageous effects in which the boom characteristics become gentle and in which the machine body 2 is stabilized can be expected.

Also in the case where the boom cylinder C3 and the other hydraulic actuator AC, which is different from the arm cylinder C4, are operated in combination, the boom 15 and a member that is driven by the other hydraulic actuator AC can be moved harmoniously.

In the above-described hydraulic system, each of the control valves V1 to V10 (the direction switching valves DV1 to DV10) is a pilot-operated proportional solenoid valve, and the controller U1 controls the current supplied to each of the control valves V1 to V10 so as to control the pilot control pressure, so that the control valves V1 to V10 are controlled. However, the present invention is not limited to this configuration.

Figure 10:
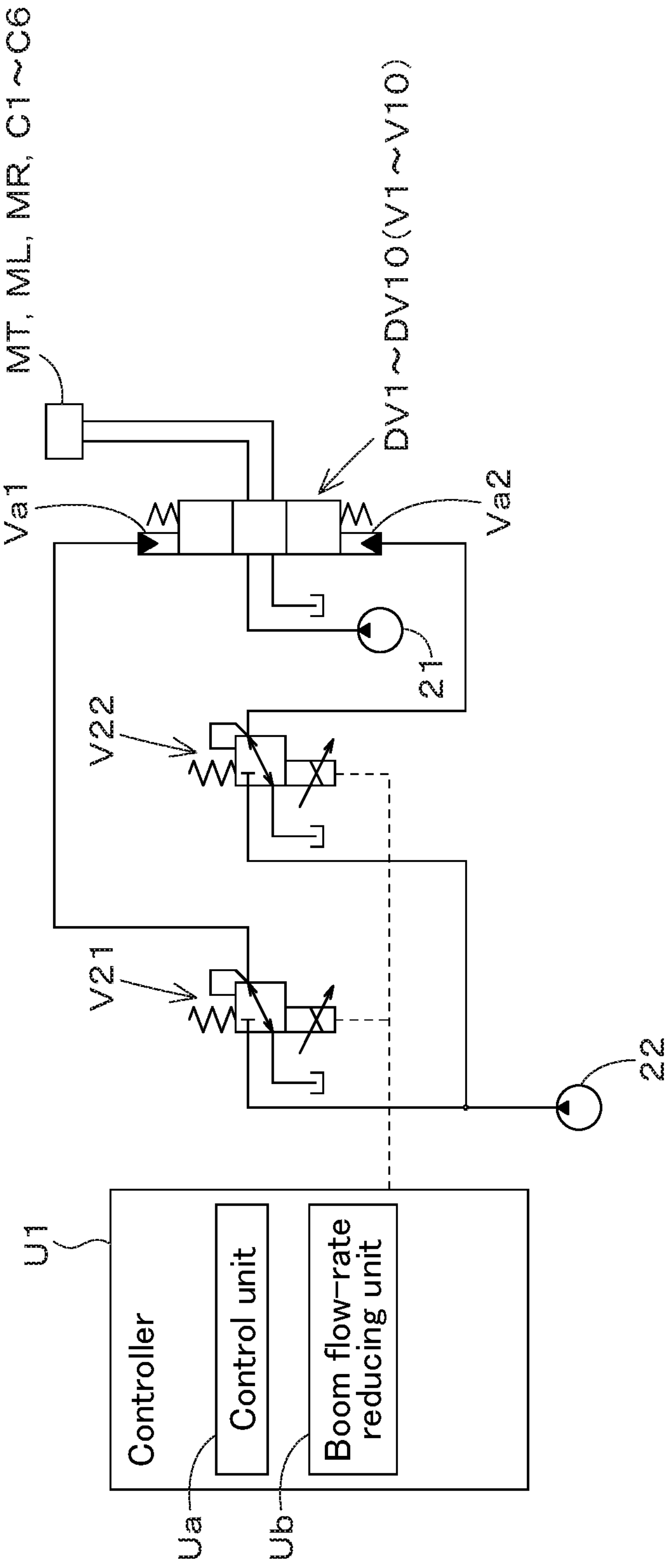
FIG. 10 is a diagram illustrating a configuration including a different type of control valve and other components.

For example, as illustrated in FIG. 10, each of the control valves V1 to V10 may be a pilot-operated switching valve that is pilot-operated by a pilot control pressure applied to a pair of pilot pressure receivers Va1 and Va2, and a pair of proportional solenoid valves V21 and V22 that are controlled by the controller U1 may be provided. In this configuration, a pilot control pressure may be applied to the pilot pressure receiver Va1 by the proportional solenoid valve V21, and a pilot control pressure may be applied to the pilot pressure receiver Va2 by the proportional solenoid valve V22 so that the flow direction and the flow rate of the hydraulic fluid with respect to the hydraulic actuators MT, ML, MR, and C1 to C6 may be controlled.

Figure 11:
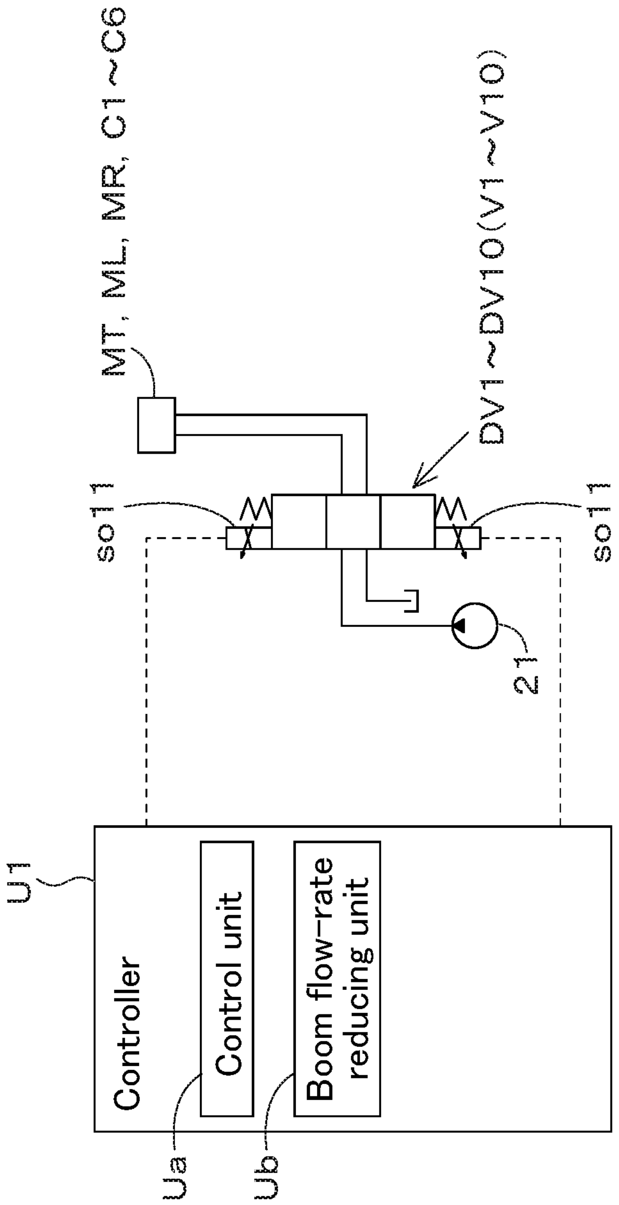
FIG. 11 is a diagram illustrating a configuration including a different type of control valve and other components.

As illustrated in FIG. 11, each of the control valves V1 to V10 may be a proportional-solenoid-type directional and flow control valve whose spool is directly driven by proportional solenoids so11 each of which is supplied with a current by the controller U1.

Figure 12:
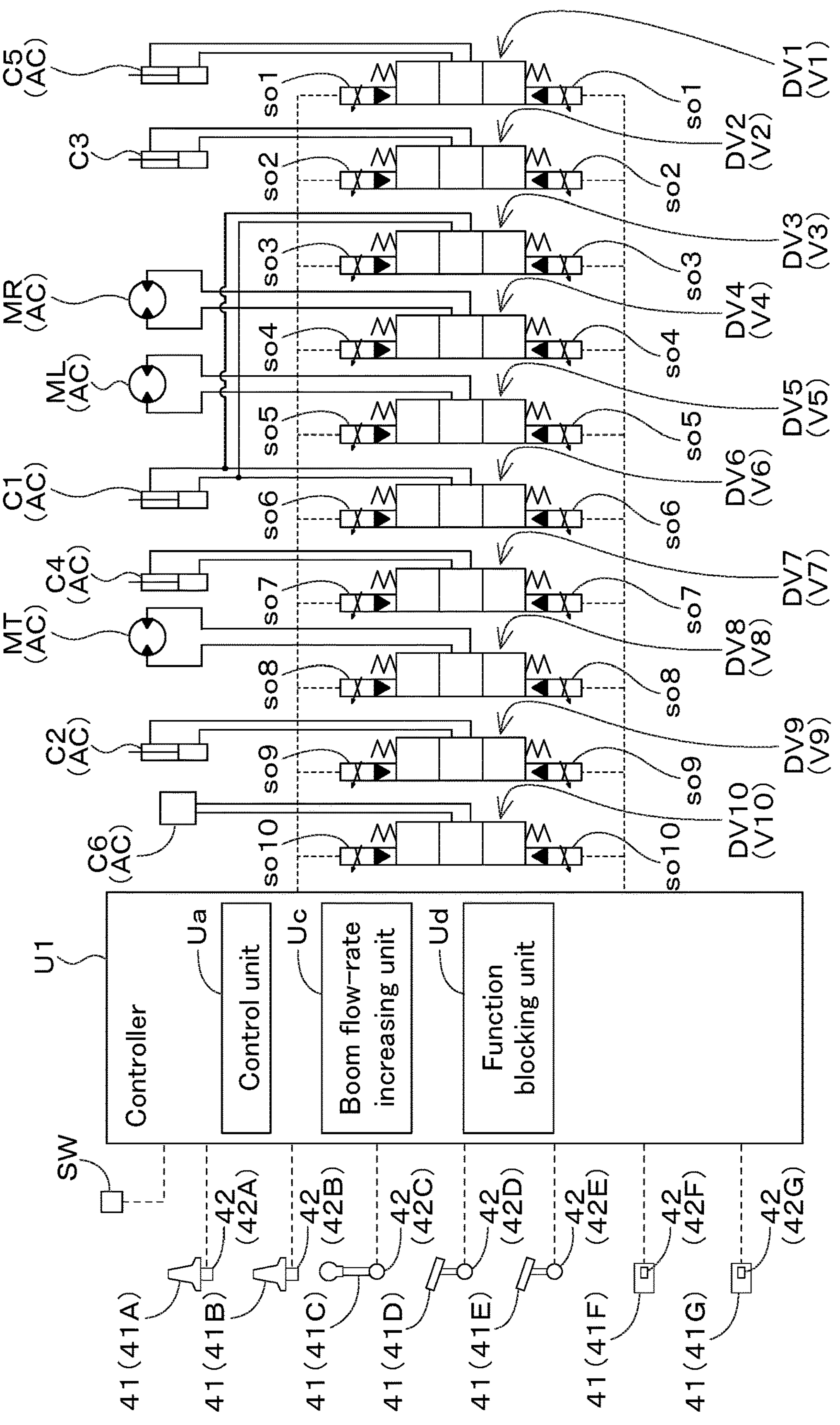
FIG. 12 is a simplified diagram of a control system according to a second embodiment.

FIG. 12 illustrates a control system according to the second embodiment.

As illustrated in FIG. 12, a switch SW is connected to the controller U1. The switch SW is a switch that switches to a crane mode for lifting a load by using a hook attached to the bucket 17.

The controller U1 includes the control unit Ua, a boom flow-rate increasing unit Uc, and a function blocking unit Ud.

The control unit Ua controls the boom control valve (the first control valve) V2 when the boom cylinder (the first hydraulic actuator) C3 is solely operated. In other words, the control unit Ua controls the boom control valve V2 when the boom control valve V2 is solely operated.

The boom flow-rate increasing unit Uc controls the boom control valve V2 when the boom cylinder (the first hydraulic actuator) C3 and the arm cylinder (the second hydraulic actuator) C4 are simultaneously operated (are operated in combination). In other words, the boom flow-rate increasing unit Uc controls the boom control valve V2 when the boom control valve V2 and the arm control valve V7 are operated in combination. More specifically, when the arm cylinder C4 (the arm control valve V7) and the boom cylinder C3 (the boom control valve V2) are operated in combination, the boom flow-rate increasing unit Uc performs control so as to increase the flow rate of the hydraulic fluid supplied from the boom control valve V2 to the boom cylinder C3.

Note that, also in the second embodiment, the second hydraulic actuator is not limited to the arm cylinder C4, and the second hydraulic actuator may be the other hydraulic actuator AC (one of the arm cylinder C4, the traveling motor M1, the slewing motor MT, the dozer cylinder C1, the swing cylinder C2, the working-tool cylinder C5, and the attachment actuator C6) that is different from the boom cylinder C3.

The function blocking unit Ud does not allow the boom flow-rate increasing unit Uc to function when the arm cylinder C4 (the other hydraulic actuator AC that is different from the boom cylinder C3) is operated while the boom cylinder C3 is solely operated in a direction in which the boom 15 is raised. In the present embodiment, the function blocking unit Ud functions in a state where the crane mode is selected by the switch SW. The boom flow-rate increasing unit Uc is configured to increase the flow rate of the hydraulic fluid supplied to the boom cylinder C3 and increase the speed of the boom 15 when the boom cylinder C3 and the arm cylinder C4 are operated in combination. However, for example, if the speed of the boom 15 increases when the arm 16 is operated during crane work, it may sometimes be difficult to stably perform the crane work. Accordingly, the boom flow-rate increasing unit Uc is configured not to function in a state where the crane mode is selected. As a result, even if the arm cylinder C4 (the other hydraulic actuator AC that is different from the boom cylinder C3) is operated during crane work, the raising speed of the boom 15 does not change, and a stable lifting operation can be performed.

Note that, as will be described later, in the case where the boom cylinder C3 is operated by fully operating the manipulator 41 (the second manipulator 41B) (by operating the manipulator 41 to its stroke end), the flow rate of the hydraulic fluid supplied to the boom cylinder C3 when the boom cylinder C3 is solely operated is the same as that when the boom cylinder C3 and the arm cylinder C4 (the other hydraulic actuator AC) are operated in combination, and thus, the function blocking unit Ud can function except when the manipulator 41 is fully operated.

Figure 13:
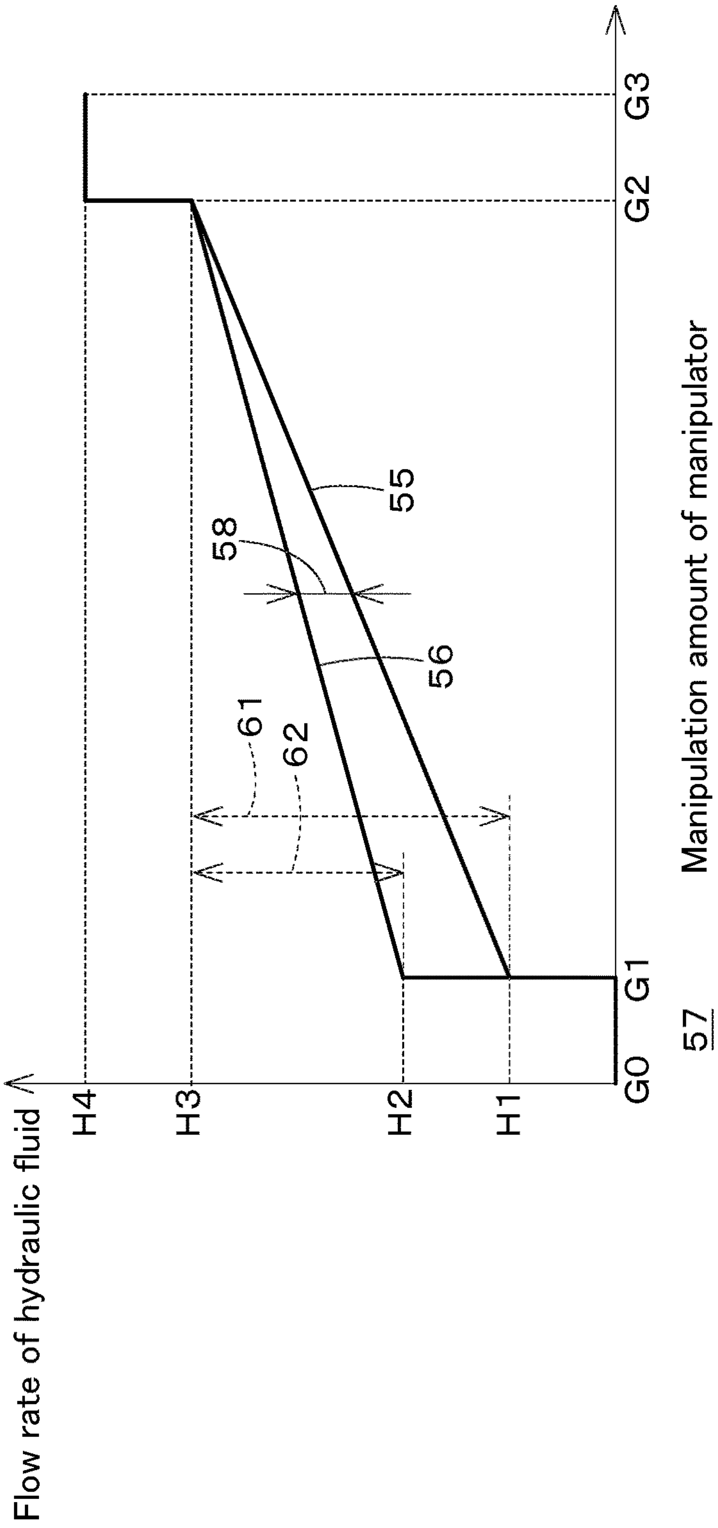
FIG. 13 is a graph illustrating a relationship between the manipulation amount of a manipulator according to the second embodiment and the flow rate of a hydraulic fluid.

FIG. 13 is a graph illustrating a relationship between the manipulation amount of one of the manipulators 41 and the flow rate of the hydraulic fluid. In FIG. 13, the horizontal axis denotes the manipulation amount of the manipulator 41 (the second manipulator 41B), and the vertical axis denotes the flow rate of the hydraulic fluid supplied from the boom control valve V2 to the boom cylinder C3 (the value of the current supplied to the proportional solenoids so2, that is, the pilot control pressure that pilot-operates the boom control valve V2).

In FIG. 13, a third line 55 the case where the control unit Ua controls the flow rate of the hydraulic fluid supplied from the boom control valve V2 to the boom cylinder C3 with respect to the manipulation amount of the manipulator 41. In other words, the third line 55 indicates changes in the flow rate of the hydraulic fluid according to the manipulation amount to operate the boom cylinder C3 when the boom cylinder C3 is solely operated.

In FIG. 13, a fourth line 56 indicates the case where the boom flow-rate increasing unit Uc controls the flow rate of the hydraulic fluid supplied from the boom control valve V2 to the boom cylinder C3 with respect to the manipulation amount of the manipulator 41. In other words, the fourth line 56 indicates changes in the flow rate of the hydraulic fluid according to the manipulation amount to operate the boom cylinder C3 when the boom cylinder C3 and the arm cylinder C4 (the other hydraulic actuator AC) are operated in combination.

In FIG. 13, the flow rate of the hydraulic fluid increases with increasing distance from the origin of the graph. The manipulation amount of the manipulators 41 is zero (in a non-operating state) at the origin of the graph and increases with increasing distance from the origin. Accordingly, in the graph, a manipulation amount region adjacent to the origin is defined as a pre-operation region 57 to start operating the boom control valve V2.

In the range from a manipulation amount G0 at which the manipulation amount is zero to a manipulation amount G1, the flow rate of the hydraulic fluid is zero, and this range is a dead zone in which the boom 15 does not move even if the manipulators 41 is operated. At the manipulation amount G1, the flow rate of the hydraulic fluid increases at a stroke to a flow rate H1 or a flow rate H2. In the case of the third line 55, the flow rate of the hydraulic fluid at the manipulation amount G1 is the flow rate H1, and in the case of the fourth line 56, the flow rate of the hydraulic fluid at the manipulation amount G1 is the flow rate H2, which is higher than the flow rate H1. In other words, at the manipulation amount adjacent to the pre-operation region 57 to start operating the boom control valve V2, the flow rate of the hydraulic fluid with respect to the manipulation amount to operate the boom cylinder C3 when the arm cylinder C4 (the other hydraulic actuator AC) and the boom cylinder C3 are operated in combination is determined to be higher than that when the boom cylinder C3 is solely operated.

Each of the third line 55 and the fourth line 56 is inclined upward to the right from the manipulation amount G1 to the manipulation amount G2, which is near a full manipulation amount, and the flow rate of the hydraulic fluid converges to a flow rate H3 at the manipulation amount G2. In other words, the flow rate H2 at the manipulation amount G1 adjacent to the pre-operation region 57 on the fourth line 56 is higher than the flow rate H1 at the manipulation amount G1 adjacent to the pre-operation region 57 on the third line 55, and the inclination of the fourth line 56 is smaller than that of the third line 55. Thus, a difference 58 between the flow rate of the hydraulic fluid with respect to the manipulation amount to operate the boom cylinder C3 when the boom cylinder C3 and the arm cylinder C4 (the other hydraulic actuator AC) are operated in combination and the flow rate of the hydraulic fluid with respect to the manipulation amount to operate the boom cylinder C3 when the boom cylinder C3 is solely operated (the gap between the third line 55 and the fourth line 56) decreases as the manipulation amount to operate the boom cylinder C3 increases.

Note that, at the manipulation amount G2, the flow rate of the hydraulic fluid increases at a stroke from the flow rate H3 to a maximum flow rate H4, and during the period when the manipulator 41 is operated until the manipulation amount increases from the manipulation amount G2 to a manipulation amount G3 (the manipulation amount when the manipulator 41 is fully operated), the flow rate of the hydraulic fluid is the maximum flow rate H4.

In the second embodiment, the third line 55 and the fourth line 56 are each a characteristic line of an intermediate operation range from the manipulation amount G1 to the manipulation amount G2. Each of the third line 55 and the fourth line 56 may be a characteristic line from the manipulation amount G1 to the manipulation amount G3. In this case, the position of the terminal end of each of the third line 55 and the fourth line 56 is the position of the maximum flow rate H4.

In FIG. 13, the reference sign 61 denotes the amount of change in the flow rate of the hydraulic fluid supplied from the boom control valve V2 to the boom cylinder C3 with respect to changes in the manipulation amount to operate the boom cylinder C3 when the boom cylinder C3 is solely operated.

In FIG. 13, the reference sign 62 denotes the amount of change in the flow rate of the hydraulic fluid supplied from the boom control valve V2 to the boom cylinder C3 with respect to changes in the manipulation amount to operate the boom cylinder C3 when the arm cylinder C4 (the other hydraulic actuator AC) and the boom cylinder C3 are operated in combination.

As seen from FIG. 13, the amount of change 62 is smaller than the amount of change 61. In other words, the controller U1 performs control in such a manner that the amount of change 62 in the flow rate of the hydraulic fluid supplied from the boom control valve V2 to the boom cylinder C3 with respect to changes in the manipulation amount to operate the boom cylinder C3 when the arm cylinder C4 (the other hydraulic actuator AC) and the boom cylinder C3 are operated in combination is smaller than the amount of change 63 in the flow rate of the hydraulic fluid supplied from the boom control valve V2 to the boom cylinder C3 with respect to changes in the manipulation amount to operate the boom cylinder C3 when the boom cylinder C3 is solely operated.

In the second embodiment, when the arm cylinder C4 (the other hydraulic actuator AC) and the boom cylinder C3 are operated in combination, the boom flow-rate increasing unit Uc determines the flow rate of the hydraulic fluid supplied from the boom control valve V2 with respect to the manipulation amount to operate the boom cylinder C3 so that, when the manipulation amount to operate the boom cylinder C3 is the manipulation amount G1 adjacent to the pre-operation region 57 to start operating the boom control valve V2, the flow rate determined by the boom flow-rate increasing unit Uc is higher than that when the boom cylinder C3 is solely operated and so that, as the manipulation amount to operate the boom cylinder C3 increases, the difference 58 between the flow rate of the hydraulic fluid with respect to changes in the manipulation amount to operate the boom cylinder C3 when the boom cylinder C3 and the arm cylinder C4 (the other hydraulic actuator AC) are operated in combination and the flow rate of the hydraulic fluid with respect to changes in the manipulation amount to operate the boom cylinder C3 when the boom cylinder C3 is solely operated reduces, so that the amount of change 62 becomes smaller than the amount of change 61.

It is understood from the third line 55 and the fourth line 56 in FIG. 13 that, in the case where the manipulation amount of the manipulator 41 (the second manipulator 41B) when the boom cylinder C3 (the boom control valve V2) is solely operated and the manipulation amount of the manipulator 41 (the second manipulator 41B) when the arm cylinder C4 (the arm control valve V7) and the boom cylinder C3 (the boom control valve V2) are operated in combination are the same, the flow rate of the hydraulic fluid supplied from the boom control valve V2 to the boom cylinder C3 when the arm cylinder C4 (the arm control valve V7) and the boom cylinder C3 (the boom control valve V2) are operated in combination is higher than that when the boom cylinder C3 (the boom control valve V2) is solely operated. In other words, when the arm cylinder C4 (the arm control valve V7) and the boom cylinder C3 (the boom control valve V2) are operated in combination, the flow rate of the hydraulic fluid supplied to the boom cylinder C3 with respect to the manipulation amount of the manipulator 41 (the second manipulator 41B) increases.

That is to say, the boom flow-rate increasing unit Uc causes the hydraulic fluid to be supplied from the boom control valve V2 to the boom cylinder C3 such that the flow rate of this hydraulic fluid with respect to the manipulation amount of the manipulator 41 is higher than the flow rate of the hydraulic fluid that is controlled by the control unit Ua with respect to the same manipulation amount of the manipulator 41. Thus, when the boom cylinder C3 (the boom control valve V2) is operated while the arm cylinder C4 (the arm control valve V7) is operated, the boom flow-rate increasing unit Uc increases the flow rate of the hydraulic fluid supplied from the boom control valve V2 to the boom cylinder C3. In other words, the boom flow-rate increasing unit Uc causes the hydraulic fluid to be supplied from the boom control valve V2 to the boom cylinder C3 such that the flow rate of this hydraulic fluid with respect to the manipulation amount of the manipulator 41 (the second manipulator 41B) is lower than the flow rate of the hydraulic fluid that is controlled by the control unit Ua in accordance with the same manipulation amount.

In the second embodiment, the flow rate of the hydraulic fluid supplied from the boom control valve V2 to the boom cylinder C3 is increased by increasing the pilot control pressure, which is controlled by a control signal transmitted from the controller U1 to the boom control valve V2. In other words, the controller U1 increases the current supplied to the boom control valve V2, so that the flow rate of the hydraulic fluid supplied from the boom control valve V2 to the boom cylinder C3 is increased.

In the second embodiment, when the boom 15 is operated while the arm 16 is operated, the flow rate of the hydraulic fluid supplied from the boom control valve V2 to the boom cylinder C3 increased by increasing the pilot control pressure to be larger than that when the boom 15 is solely operated, so that the raising speed of the boom 15 is increased, and the boom 15 can be stably operated. In addition, the horizontal movement of the bucket teeth 17*a* at the end of the bucket 17 is facilitated. As a result, the boom 15 can be easily operated in the case of raising the boom 15 while swinging the arm 16 in the arm-crowd direction D1 or in the case of lowering the boom 15 while swinging the arm 16 in the arm-dump direction D2.

In the second embodiment, for example, when a horizontal pulling operation is performed in a state where the manipulation amount to operate the boom cylinder C3 and the manipulation amount to operate the arm cylinder C4 are the same and where the speed of the arm 16 is higher than the speed of the boom 15, the boom 15 and the arm 16 can be moved harmoniously by increasing the speed of the boom 15, and a favorable horizontal pulling operation can be performed. More specifically, in the case where the speed of the arm 16 is set to increase in order to increase the working capacity, if a horizontal pulling operation is performed, there is a possibility that the bucket teeth 17*a* at the end of the bucket 17 will dig into the earth (the bucket teeth 17*a* will fall) when the boom 15 and the arm 16 are actuated. In such a case, the boom 15 and the arm 16 can be moved harmoniously by increasing the speed of the boom 15, and a favorable horizontal pulling operation can be performed.

The above-described first embodiment is effective when, for example, a horizontal pulling operation is performed in a state where the manipulation amount to operate the boom cylinder C3 and the manipulation amount to operate the arm cylinder C4 are the same and where the speed of the arm 16 is lower than the speed of the boom 15. The second embodiment is effective when, for example, a horizontal pulling operation is performed in a state where the manipulation amount to operate the boom cylinder C3 and the manipulation amount to operate the arm cylinder C4 are the same and where the speed of the arm 16 is higher than the speed of the boom 15.

Also in the second embodiment, when the other hydraulic actuator (the second hydraulic actuator) AC that is different from the boom cylinder C3 and that is not the arm cylinder C4 and the boom cylinder C3 are operated in combination, the flow rate of the hydraulic fluid supplied from the boom control valve V2 to the boom cylinder C3 may be increased. In other words, the boom flow-rate increasing unit Uc controls the flow rate of the hydraulic fluid supplied from the boom control valve V2 to the boom cylinder C3 when the boom cylinder C3 and the other hydraulic actuator AC that is different from the boom cylinder C3 are operated in combination.

Also when the boom cylinder C3 and the other hydraulic actuator AC that is not the arm cylinder C4 are operated in combination, the boom 15 and another member that is driven by the other hydraulic actuator AC can be moved harmoniously.

Note that the controller U1 may include the boom flow-rate reducing unit Ub and the boom flow-rate increasing unit Uc, and may switch, in accordance with the working machine 1 that includes the controller U1, in such a manner that the boom flow-rate reducing unit Ub functions while the boom flow-rate increasing unit Uc does not function or the boom flow-rate increasing unit Uc functions while the boom flow-rate reducing unit Ub does not function.

Also in the second embodiment, as illustrated in FIG. 10, each of the control valves V1 to V10 may be a pilot-operated switching valve, and the pair of proportional solenoid valves V21 and V22 that are controlled by the controller U1 may be provided such that a pilot control pressure is applied to the pilot pressure receiver Va1 by the proportional solenoid valve V21 and such that a pilot control pressure may be applied to the pilot pressure receiver Va2 by the proportional solenoid valve V22. As illustrated in FIG. 11, each of the control valves V1 to V10 may be a proportional-solenoid-type directional and flow control valve whose spool is directly driven by the proportional solenoids so11 each of which is supplied with a current by the controller U1.

Figure 14:
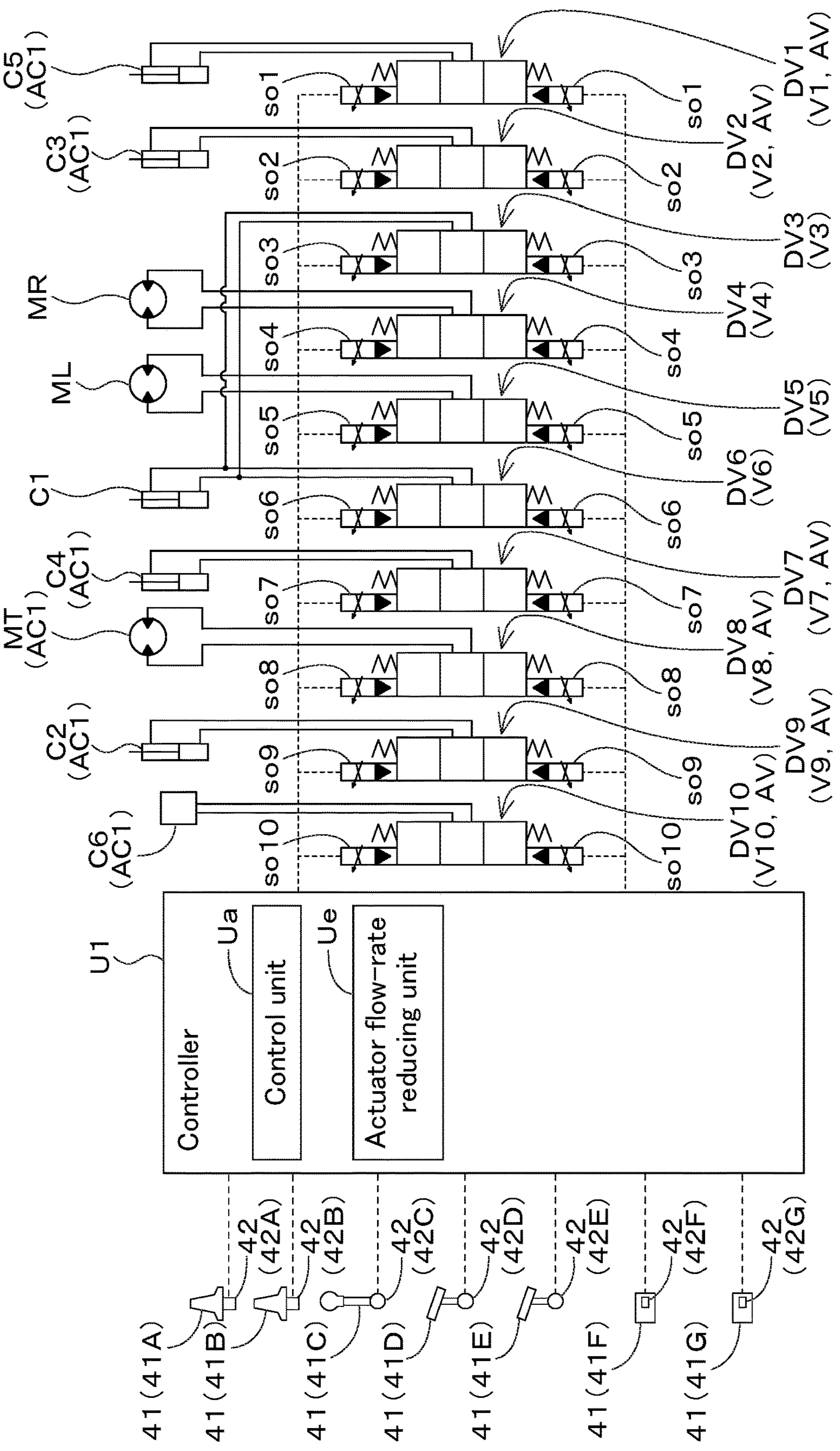
FIG. 14 is a simplified diagram of a control system according to a third embodiment.

FIG. 14 illustrates a control system according to the third embodiment.

As illustrated in FIG. 14, the controller U1 includes the control unit Ua and an actuator flow-rate reducing unit Ue.

When at least one of other hydraulic actuators AC1 (the first hydraulic actuator) that is different from the traveling motor (the second hydraulic actuator) M1 is solely operated, the control unit Ua controls one of actuator control valves AV (the first control valve) that controls the other hydraulic actuator AC1. In other words, the control unit Ua controls the actuator control valve (the first control valve) AV when the actuator control valve AV is solely operated.

The actuator flow-rate reducing unit Ue controls the actuator control valve (the first control valve) AV when the traveling motor (the second hydraulic actuator) M1 and the other hydraulic actuator (the first hydraulic actuator) AC1 are operated in combination. In other words, when the first traveling control valve V5, the second traveling control valve V4, and the actuator control valve AV, which controls the other hydraulic actuator AC1, are operated in combination, the actuator flow-rate reducing unit Ue controls the actuator control valve AV. The phrase "be operated in combination" refers to simultaneous operation of at least two (more than one) of the control valves V1 to V10.

More specifically, when the other hydraulic actuator AC1 that is different from the traveling motor M1 is operated while the traveling device 3 is driven, the actuator flow-rate reducing unit Ue controls the flow rate of the hydraulic fluid supplied from the actuator control valve AV, which controls the other hydraulic actuator AC1, to the other hydraulic actuator AC1. The other hydraulic actuator (the first hydraulic actuator) AC1 is, for example, any one of the slewing motor MT, the boom cylinder C3, the arm cylinder C4, and the working-tool cylinder C5 that are operated by the first manipulator 41A and the second manipulator 41B, and the actuator control valve AV is a corresponding one of the slew control valve V8, the boom control valve V2, the arm control valve V7, and the working-tool control valve V1. In other words, when the traveling device 3 (the first traveling control valve V5, the second traveling control valve V4), the working device 4 (the boom control valve V2, the arm control valve V7, the working-tool control valve V1), and the machine body 2 (the slew control valve V8) are operated in combination, the actuator flow-rate reducing unit Ue controls the flow rate of the hydraulic fluid supplied from the actuator control valve AV to the other hydraulic actuator AC1.

Note that, the swing cylinder C2 and the attachment actuator C6 may be included in the other hydraulic actuators AC1.

Figure 15:
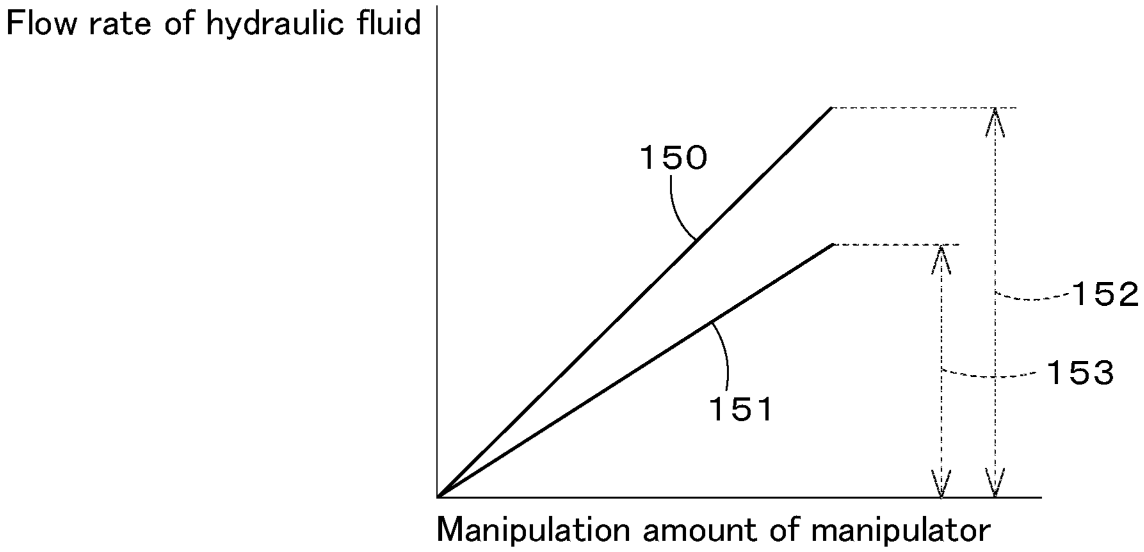
FIG. 15 is a graph illustrating a relationship between the manipulation amount of a manipulator according to the third embodiment and the flow rate of a hydraulic fluid.

FIG. 15 is a graph illustrating a relationship between the manipulation amount of one of the manipulators 41 and the flow rate of a hydraulic fluid. In FIG. 15, the horizontal axis denotes the manipulation amount of the manipulator 41, and the vertical axis denotes the flow rate of the hydraulic fluid that is supplied from one of the actuator control valves AV to the corresponding other hydraulic actuator AC1.

In FIG. 15, a first line 150 indicates the case where the control unit Ua controls the flow rate the hydraulic fluid supplied from the actuator control valve AV to the corresponding other hydraulic actuator AC1 with respect to the manipulation amount of the manipulator 41. In other words, the first line 150 indicates changes in the flow rate of the hydraulic fluid according to the manipulation amount of the other hydraulic actuator AC1 when the other hydraulic actuator AC1 is solely operated.

In FIG. 15, a second line 151 indicates the case where the actuator flow-rate reducing unit Ue controls the flow rate of the hydraulic fluid supplied from the actuator control valve AV (the slew control valve V8, the boom control valve V2, the arm control valve V7, the working-tool control valve V1) to the hydraulic actuator AC (the slewing motor MT, the boom cylinder C3, the arm cylinder C4, the working-tool cylinder C5) with respect to the manipulation amount of the manipulator 41. In other words, the second line 151 indicates changes in the flow rate of the hydraulic fluid according to the manipulation amount of the other hydraulic actuator AC1 when the traveling motor M1 and the other hydraulic actuator AC1 are operated in combination.

In FIG. 15, the reference sign 152 denotes the amount of change in the flow rate of the hydraulic fluid supplied from the actuator control valve AV to the other hydraulic actuator AC1 with respect to changes in the manipulation amount of the other hydraulic actuator AC1 when the other hydraulic actuator AC1 is solely operated.

In FIG. 15, the reference sign 153 denotes the amount of change in the flow rate of the hydraulic fluid supplied from the actuator control valve AV to the other hydraulic actuator AC1 with respect to changes in the manipulation amount of the other hydraulic actuator AC1 when the traveling motor M1 and the other hydraulic actuator AC1 are operated in combination.

As seen from FIG. 15, the inclination of the second line 151 is smaller than that of the first line 150, and the amount of change 153 is smaller than the amount of change 152. In other words, the controller U1 performs control in such a manner that the amount of change 153 in the flow rate of the hydraulic fluid supplied from the actuator control valve (the first control valve) AV to the other hydraulic actuator (the first hydraulic actuator) AC1 with respect to changes in the manipulation amount of the other hydraulic actuator (the first hydraulic actuator) AC1 when the other hydraulic actuator (the first hydraulic actuator) AC1 and the traveling motor (the second hydraulic actuator) M1 are operated in combination is smaller than the amount of change 152 in the flow rate of the hydraulic fluid supplied from the actuator control valve (the first control valve) AV to the other hydraulic actuator (the first hydraulic actuator) AC1 with respect to changes in the manipulation amount of the other hydraulic actuator (the first hydraulic actuator) AC1 when the other hydraulic actuator (the first hydraulic actuator) AC1 is solely operated.

In addition, as illustrated in FIG. 15, in the third embodiment, when the other hydraulic actuator AC1 and the traveling motor M1 are operated in combination, the flow rate of the hydraulic fluid supplied from the actuator control valve AV to the other hydraulic actuator AC1 is reduced by the actuator flow-rate reducing unit Ue so as to reduce the amount of change 153 to be smaller than the amount of change 152.

More specifically, it is understood from the first line 150 and the second line 151 in FIG. 15 that, in the case where the manipulation amount of the manipulator 41 when the other hydraulic actuator AC1 (the actuator control valve AV) is solely operated is the same as the manipulation amount of the manipulator 41 when the traveling motor M1 (the first traveling control valve V5 and the second traveling control valve V4) and the other hydraulic actuator AC1 (the actuator control valve AV) are operated in combination, the flow rate of the hydraulic fluid supplied from the actuator control valve AV to the other hydraulic actuator AC1 when the traveling motor M1 (the first traveling control valve V5 and the second traveling control valve V4) and the other hydraulic actuator AC1 (the actuator control valve AV) are operated in combination is lower than that when the other hydraulic actuator AC1 (the actuator control valve AV) is solely operated. In other words, when the traveling motor M1 (the first traveling control valve V5 and the second traveling control valve V4) and the other hydraulic actuator AC1 (the actuator control valve AV) are operated in combination, the flow rate of the hydraulic fluid supplied to the other hydraulic actuator AC1 with respect to the manipulation amount of the manipulator 41 is reduced.

In other words, the actuator flow-rate reducing unit Ue causes the hydraulic fluid to be supplied from the actuator control valve AV to the other hydraulic actuator AC1 at a flow rate lower than the flow rate of the hydraulic fluid controlled by the control unit Ua with respect to the same manipulation amount of the manipulator 41. When the other hydraulic actuator AC1 is operated while the traveling motor M1 is operated, the actuator flow-rate reducing unit Ue reduces the flow rate of the hydraulic fluid supplied from the actuator control valve AV to the other hydraulic actuator AC1. In other words, the actuator flow-rate reducing unit Ue causes the hydraulic fluid to be supplied from the actuator control valve AV to the other hydraulic actuator AC1 such that the flow rate of this hydraulic fluid with respect to the manipulation amount of the manipulator 41 is lower than the flow rate of the hydraulic fluid that is controlled by the control unit Ua in accordance with the same manipulation amount.

In the present embodiment, by reducing the pilot control pressure that is controlled by a control signal transmitted from the controller U1 to the actuator control valve AV, the flow rate of the hydraulic fluid supplied from the actuator control valve AV to the boom cylinder C3 is reduced. In other words, the controller U1 reduces the current that is supplied to the actuator control valve AV, so that the flow rate of the hydraulic fluid supplied from the actuator control valve AV to the other hydraulic actuator AC1 is reduced.

Note that the reduction rate of the flow rate of the hydraulic fluid supplied from the actuator control valve AV to the other hydraulic actuator AC1 (the reduction amount of the pilot control pressure) may be set for each of the other hydraulic actuators AC1 (the slewing motor MT, the boom cylinder C3, the arm cylinder C4, and the working-tool cylinder C5).

In the related art, when the other hydraulic actuator AC1 is operated, while the working machine 1 is traveling, there is a problem in that the flow rate of the hydraulic fluid supplied to the traveling motor M1 decreases as a result of some of the hydraulic fluid being supplied to the other hydraulic actuator AC1, so that the traveling speed of the working machine decreases, which in turn results in a shock.

In the present embodiment, when the other hydraulic actuator AC1 is operated while the working machine 1 is traveling, the flow rate of the hydraulic fluid supplied from the actuator control valve AV to the other hydraulic actuator AC1 is reduced, so that the flow rate of the hydraulic fluid supplied to the traveling motor M1 is ensured, and a decrease in the traveling speed can be suppressed. In addition, since the working machine 1 includes the load sensing system, the intermediate flow rate characteristics are stable, and thus, even if the speed of the other hydraulic actuator AC1 is slowed down as a result of the flow rate of the hydraulic fluid being reduced by reducing the pilot control pressure, a stable operation can be performed.

Also in the third embodiment, even when the traveling motor (the second hydraulic actuator) M1 and the other hydraulic actuator (the first hydraulic actuator) AC1 that is different from the traveling motor M1 are operated in combination, the traveling motor M1 and another member that is driven by the other hydraulic actuator AC1 can be moved harmoniously.

Note that, in the present embodiment, the first traveling control valve V5 and the second traveling control valve V4 are each configured to be controlled by the pilot control pressure that is controlled by a control signal transmitted from the controller U1. However, the present invention is not limited to this configuration, and the first traveling control valve V5 and the second traveling control valve V4 may each be configured to be pilot-operated by a pilot control pressure output from a remote-control valve that is operated by a manipulator. Alternatively, the first traveling control valve V5 and the second traveling control valve V4 may each be a valve that is directly operated by a manipulator (a valve that is manually operated).

In the above-described hydraulic system, each of the control valves V1 to V10 (the direction switching valves DV1 to DV10) is a pilot-operated proportional solenoid valve, and the controller U1 controls the current supplied to each of the control valves V1 to V10 so as to control the pilot control pressure, so that the control valves V1 to V10 are controlled. However, the present invention is not limited to this configuration.

For example, as illustrated in FIG. 10, each of the control valves V1 to V10 may be a pilot-operated switching valve that is pilot-operated by a pilot control pressure applied to the pair of pilot pressure receivers Va1 and Va2, and the pair of proportional solenoid valves V21 and V22 that are controlled by the controller U1 may be provided. In this configuration, a pilot control pressure may be applied to the pilot pressure receiver Va1 by the proportional solenoid valve V21, and a pilot control pressure may be applied to the pilot pressure receiver Va2 by the proportional solenoid valve V22 so that the flow direction and the flow rate of the hydraulic fluid with respect to the hydraulic actuators MT, ML, MR, and C1 to C6 may be controlled.

As illustrated in FIG. 11, each of the control valves V1 to V10 may be a proportional-solenoid-type directional and flow control valve whose spool is directly driven by the proportional solenoids so11 each of which is supplied with a current by the controller U1.

The above-described working machine 1 includes the machine body 2, the first hydraulic actuator C3, AC1 that is included in the machine body 2, the first control valve V2, AV that controls the first hydraulic actuator C3, AC1, the controller U1 that controls the first control valve V2, AV, and the second hydraulic actuator AC, M1 that is different from the first hydraulic actuator C3, AC1. The controller U1 performs control in such a manner that the amount of change 53, 62, 153 of the flow rate of the hydraulic fluid supplied from the first control valve V2, AV to the first hydraulic actuator C3, AC1 with respect to the manipulation amount of the first hydraulic actuator C3, AC1 when the second hydraulic actuator AC, M1 and the first hydraulic actuator C3, AC1 are operated in combination is smaller than the amount of change 52, 61, 152 of the flow rate of the hydraulic fluid supplied from the first control valve V2, AV to the first hydraulic actuator C3, AC1 with respect to changes in the manipulation amount of the first hydraulic actuator C3, AC1 when the first hydraulic actuator C3, AC1 is solely operated.

With this configuration, when the first hydraulic actuator C3, AC1 and the second hydraulic actuator AC, M1 are operated in combination, a member that is operated by the first hydraulic actuator C3, AC1 and a member that is operated by the second hydraulic actuator AC, M1 can be moved harmoniously.

In addition, the working machine 1 includes the boom 15 that is supported on the machine body 2 so as to be vertically swingable, and the first hydraulic actuator is the boom cylinder C3 that enables the boom 15 to vertically swing. The first control valve is the boom control valve V2 that controls the boom cylinder C3, and the second hydraulic actuator is the other hydraulic actuator AC that is different from the boom cylinder C3.

With this configuration, at least one of the other hydraulic actuators AC and the boom cylinder C3 are operated in combination, the boom 15 and a member that is driven by the other hydraulic actuator AC can be moved harmoniously.

In addition, the controller U1 includes the boom flow-rate reducing unit Ub that reduces the amount of change 53, 62 by reducing the flow rate of the hydraulic fluid supplied from the boom control valve V2 to the boom cylinder C3 when the boom cylinder C3 is operated while at least one of the other hydraulic actuators AC is operated.

With this configuration, by reducing the flow rate of the hydraulic fluid supplied from the boom control valve V2 to the boom cylinder C3 when the boom cylinder C3 is operated while the other hydraulic actuator AC that is different from the boom cylinder C3 is operated, the boom characteristics become gentle, and the machine body 2 can be stabilized.

The boom control valve V2 is pilot-operated by the pilot control pressure that is controlled by a control signal transmitted by the controller U1, and the boom flow-rate reducing unit Ub reduces the pilot control pressure when the boom cylinder C3 is operated while at least one of the other hydraulic actuators AC is operated.

With this configuration, the flow rate at which the hydraulic fluid flows through the boom control valve V2 can be easily controlled.

The boom control valve V2 is controlled in accordance with the current supplied thereto by the controller U1, and the boom flow-rate reducing unit Ub reduces the current supplied to the boom control valve V2 when the boom cylinder C3 is operated while at least one of the other hydraulic actuators AC is operated.

Also with this configuration, the flow rate at which the hydraulic fluid flows through the boom control valve V2 can be easily controlled.

The working machine 1 includes the arm 16 that is connected to the end of the boom 15 so as to be swingable in the arm-crowd direction D1, which is a direction toward the boom 15, and the arm-dump direction D2, which is a direction away from the boom 15, and the arm cylinder C4 that enables the arm 16 to swing. The other hydraulic actuator AC is the arm cylinder C4, and the boom flow-rate reducing unit Ub reduces the flow rate of the hydraulic fluid supplied from the boom control valve V2 to the boom cylinder C3 when the boom cylinder C3 is operated while the arm cylinder C4 is operated.

With this configuration, when the boom 15 and the arm 16 are operated in combination, the boom characteristics become gentle, and the machine body 2 can be stabilized. In addition, the speed of the arm 16 can be ensured.

In the case of raising the boom 15 while swinging the arm 16 in the arm-crowd direction D1 or in the case of lowering the boom 15 while swinging the arm 16 in the arm-dump direction D2, the boom flow-rate reducing unit Ub reduces the flow rate of the hydraulic fluid supplied from the boom control valve V2 to the boom cylinder C3.

Also with this configuration, when the boom 15 and the arm 16 are operated in combination, the boom characteristics become gentle, and the machine body 2 can be stabilized. In addition, the speed of the arm 16 can be ensured.

The working machine 1 includes the manipulator 41 that operates the boom cylinder C3, and the controller U1 includes the control unit Ua that controls the flow rate of the hydraulic fluid supplied from the boom control valve V2 to the boom cylinder C3 in accordance with the manipulation amount of the manipulator 41 when the boom cylinder C3 is solely operated. The boom flow-rate reducing unit Ub causes the hydraulic fluid to be supplied from the boom control valve V2 to the boom cylinder C3 at a flow rate lower than the flow rate of the hydraulic fluid controlled by the control unit Ua with respect to the same manipulation amount of the manipulator 41.

Also with this configuration, the boom characteristics become gentle, and the machine body 2 can be stabilized.

The controller U1 further includes the boom flow-rate increasing unit Uc. When the boom cylinder C3 and at least one of the other hydraulic actuators AC are operated in combination, the boom flow-rate increasing unit Uc determines the flow rate of the hydraulic fluid supplied from the boom control valve V2 with respect to the manipulation amount to operate the boom cylinder C3 so that, when the manipulation amount to operate the boom cylinder C3 is the manipulation amount G1 adjacent to the pre-operation region 57 to start operating the boom control valve V2, the flow rate determined by the boom flow-rate increasing unit is higher than that when the boom cylinder C3 is solely operated, and so that, as the manipulation amount to operate the boom cylinder C3 increases, the difference 58 between the flow rate of the hydraulic fluid with respect to changes in the manipulation amount to operate the boom cylinder C3 when the other hydraulic actuator AC and the boom cylinder C3 are operated in combination and the flow rate of the hydraulic fluid with respect to changes in the manipulation amount to operate the boom cylinder C3 when the boom cylinder C3 is solely operated reduces, so that the amount of change 53, 62 is reduced.

With this configuration, when the other hydraulic actuator AC and the boom cylinder C3 are operated in combination, the boom 15 and a member that is driven by the other hydraulic actuator AC can be moved harmoniously.

The boom control valve V2 is pilot-operated by the pilot control pressure that is controlled by a control signal transmitted by the controller U1, and the boom flow-rate increasing unit Uc increases the pilot control pressure when the other hydraulic actuator AC and the boom cylinder C3 are operated in combination.

With this configuration, the flow rate at which the hydraulic fluid flows through the boom control valve V2 can be easily controlled.

The boom control valve V2 is controlled in accordance with the current supplied thereto by the controller U1, and the boom flow-rate increasing unit Uc increases the current supplied to the boom control valve V2 when the other hydraulic actuator AC and the boom cylinder C3 are operated in combination.

Also with this configuration, the flow rate at which the hydraulic fluid flows through the boom control valve V2 can be easily controlled.

The working machine 1 includes the arm 16 that is connected to the end of the boom 15 so as to be swingable in the arm-crowd direction D1, which is a direction toward the boom 15, and the arm-dump direction D2, which is a direction away from the boom 15, and the arm cylinder C4 that enables the arm 16 to swing. The other hydraulic actuator AC is the arm cylinder C4, and the boom flow-rate increasing unit Uc increases the flow rate of the hydraulic fluid supplied from the boom control valve V2 to the boom cylinder C3 when the boom cylinder C3 is operated while the arm cylinder C4 is operated.

With this configuration, when the boom 15 and the arm 16 are operated in combination, the boom 15 and the arm 16 can be moved harmoniously.

In the case of raising the boom 15 while swinging the arm 16 in the arm-crowd direction D1 or in the case of lowering the boom 15 while swinging the arm 16 in the arm-dump direction D2, the boom flow-rate increasing unit Uc increases the flow rate of the hydraulic fluid supplied from the boom control valve V2 to the boom cylinder C3.

With this configuration, for example, when a horizontal pulling operation is performed by operating the boom 15 and the arm 16 in combination, the boom 15 and the arm 16 can be moved harmoniously.

The working machine 1 includes the manipulator 41 that operates the boom cylinder C3, and the controller U1 includes the control unit Ua that controls the flow rate of the hydraulic fluid supplied from the boom control valve V2 to the boom cylinder C3 in accordance with the manipulation amount of the manipulator 41 when the boom cylinder C3 is solely operated. The boom flow-rate increasing unit Uc causes the hydraulic fluid to be supplied from the boom control valve V2 to the boom cylinder C3 at a flow rate higher than the flow rate of the hydraulic fluid controlled by the control unit Ua with respect to the same manipulation amount of the manipulator 41.

Also with this configuration, the boom 15 and the arm 16 can be moved harmoniously.

The controller U1 does not allow the boom flow-rate increasing unit Uc to function when the other hydraulic actuator AC is operated while the boom cylinder C3 is solely operated in a direction in which the boom 15 is raised.

With this configuration, for example, a stable lifting operation can be performed.

The working machine 1 includes the traveling device 3 that is capable of traveling and that supports the machine body 2. The second hydraulic actuator is the traveling motor M1, which is a hydraulic motor that drives the traveling device 3, and the first hydraulic actuator is one of the other hydraulic actuators AC1 that is different from the traveling motor M1. The first control valve is the actuator control valve AV that controls the other hydraulic actuator AC1, and the controller U1 includes the actuator flow-rate reducing unit Ue that reduces the flow rate of the hydraulic fluid supplied from the actuator control valve AV to the other hydraulic actuator AC1 when the other hydraulic actuator AC1 is operated while the traveling motor M1 is driven.

With this configuration, when the other hydraulic actuator AC1 and the traveling motor M1 are operated in combination, the traveling device 3 and another member that is driven by the other hydraulic actuator AC1 can be moved harmoniously.

The working machine 1 includes the variable displacement pump 21 that delivers the hydraulic fluid for actuating the plurality of hydraulic actuators MT, ML, MR, and C1 to C6 including the first hydraulic actuators C3, AC1 and the second hydraulic actuator AC, M1 and the load sensing system that controls the pump 21 such that the differential pressure obtained by subtracting the highest load pressure among the load pressures of the plurality of hydraulic actuators MT, ML, MR, and C1 to C6 from the delivery pressure of the pump 21 is kept constant.

With this configuration, since the working machine 1 includes the load sensing system, the intermediate flow rate characteristics are stable, and thus, even if the flow rate of the hydraulic fluid is reduced or increased, a stable operation can be performed.

The working machine 1 includes the variable displacement pump 21 that delivers the hydraulic fluid for actuating the boom cylinder C3 and the plurality of hydraulic actuators MT, ML, MR, and C1 to C6 including the other hydraulic actuators AC and the load sensing system that controls the pump 21 such that the differential pressure obtained by subtracting the highest load pressure among the load pressures of the plurality of hydraulic actuators MT, ML, MR, and C1 to C6 from the delivery pressure of the pump 21 is kept constant.

Also with this configuration, since the working machine 1 includes the load sensing system, the intermediate flow rate characteristics are stable, and thus, even if the flow rate of the hydraulic fluid is reduced or increased, a stable operation can be performed.

The above-described working machine 1 includes the machine body 2, the traveling device 3 that is capable of traveling and that supports the machine body 2, the traveling motor M1, which is a hydraulic motor that drives the traveling device 3, and the other hydraulic actuators AC1 each of which is different from the traveling motor M1, the actuator control valves AV each of which controls a corresponding one of the other hydraulic actuators AC1, and the controller U1 that controls the actuator control valve AV. The controller U1 includes the actuator flow-rate reducing unit Ue that reduces the flow rate of the hydraulic fluid supplied from the actuator control valve AV to the other hydraulic actuator AC1 when at least one of the other hydraulic actuator AC1 is operated when the traveling device 3 is driven.

With this configuration, when the other hydraulic actuator AC1, which is different from the traveling motor M1, is operated while the working machine 1 is traveling, the flow rate of the hydraulic fluid supplied from the actuator control valve AV to the other hydraulic actuator AC1 is reduced, so that the flow rate of the hydraulic fluid supplied to the traveling motor M1 can be ensured, and a decrease in the traveling speed can be suppressed.

In addition, the actuator control valve AV is pilot-operated by the pilot control pressure that is controlled by a control signal transmitted by the controller U1, and the actuator flow-rate reducing unit Ue reduces the pilot control pressure when the other hydraulic actuator AC1 is operated while the traveling device 3 is driven.

With this configuration, the flow rate at which the hydraulic fluid flows through the actuator control valve AV can be easily controlled.

The actuator control valve AV is controlled in accordance with the current supplied thereto by the controller U1, and the actuator flow-rate reducing unit Ue reduces the current supplied to the actuator control valve AV when the other hydraulic actuator AC1 is operated while the traveling device 3 is driven.

Also with this configuration, the flow rate at which the hydraulic fluid flows through the actuator control valve AV can be easily controlled.

The working machine 1 includes the manipulators 41 that operate the other hydraulic actuators AC1, and the controller U1 includes the control unit Ua that controls the flow rate of the hydraulic fluid supplied from the actuator control valve AV to the other hydraulic actuator AC1 in accordance with the manipulation amount of the corresponding manipulator 41 when one of the other hydraulic actuator AC1 is solely operated. The actuator flow-rate reducing unit Ue causes the hydraulic fluid to be supplied from the actuator control valve AV to the other hydraulic actuator AC1 at a flow rate lower than the flow rate of the hydraulic fluid controlled by the control unit Ua with respect to the same manipulation amount of the manipulator 41.

Also with this configuration, a decrease in the traveling speed can be suppressed as a result of ensuring the flow rate of the hydraulic fluid supplied to the traveling motor M1.

The working machine 1 includes the boom cylinder C3 that drives the boom 15, which is supported on the machine body 2 so as to be vertically swingable, the arm cylinder C4 that drives the arm 16, which is connected to the end of the boom 15, the working-tool cylinder C5 that drives the working tool 17, which is connected to the end of the arm 16 so as to be swingable, and the slewing motor MT, which is a hydraulic motor that enables the machine body 2 to turn around the axis that extends in the vertical direction. The other hydraulic actuators AC1 includes at least the boom cylinder C3, the arm cylinder C4, the working-tool cylinder C5, and the slewing motor MT.

With this configuration, a decrease in the traveling speed when the boom 15, the arm 16, the working tool 17, and the machine body 2 are operated while the working machine 1 is traveling can be suppressed.

The working machine 1 includes the variable displacement pump 21 that delivers the hydraulic fluid for actuating the traveling motor M1 and the plurality of hydraulic actuators MT, ML, MR, and C1 to C6 including the other hydraulic actuators AC1 and the load sensing system that controls the pump 21 such that the differential pressure obtained by subtracting the highest load pressure among the load pressures of the plurality of hydraulic actuators MT, ML, MR, and C1 to C6 from the delivery pressure of the pump 21 is kept constant.

With this configuration, since the working machine 1 includes the load sensing system, the intermediate flow rate characteristics are stable, and thus, a stable operation can be performed even if the flow rate of the hydraulic fluid is reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a machine body;

a boom supported on the machine body in such a manner as to be vertically swingable;

a first hydraulic actuator mounted on the machine body;

a manipulator manipulable to operate the first hydraulic actuator;

a first control valve to change a flow rate of a hydraulic fluid to be supplied to the first hydraulic actuator, a controller configured or programmed to control operation of the first control valve in accordance with a manipulation amount of the manipulator; and a second hydraulic actuator that is different from the first hydraulic actuator, wherein the first hydraulic actuator is a boom cylinder to cause the boom to vertically swing, the first control valve is a boom control valve to control the boom cylinder, the second hydraulic actuator is another hydraulic actuator that is different from the boom cylinder;

when the boom cylinder is solely operated without operating the other hydraulic actuator, the controller is configured or programmed to control the operation of the boom control valve in proportion to the manipulation amount of the manipulator to change the flow rate of a hydraulic fluid supplied from the boom control valve to the boom cylinder at a first change rate that is an amount of change in the flow rate relative to a change in the manipulation amount of the manipulator when the boom cylinder is solely operated without operating the other hydraulic actuator, and when the boom cylinder is operated in the combination with operating the other hydraulic actuator, the controller is configured or programmed to:

control the operation of the boom control valve in proportion to the manipulation amount of the manipulator such that, as the manipulation amount of the manipulator increases from a start-point manipulation amount corresponding to a position of the manipulator to cause the boom control valve to start delivering the hydraulic fluid to the boom cylinder, the flow rate of the hydraulic fluid supplied from the boom control valve to the boom cylinder changes at a second change rate that is an amount of change in the flow rate relative to a change in the manipulation amount of the manipulator when the boom cylinder is operated in combination with operating the other hydraulic actuator; and set the second change rate to be smaller than the first change rate, assuming that the manipulation amount of the manipulator to solely operate the boom cylinder without operating the other hydraulic actuator is the same as the manipulation amount of the manipulator to operate the boom cylinder in combination with operating the other hydraulic actuator.

2. The working machine according to claim 1, wherein the controller includes a boom flow-rate reducing unit configured or programmed to reduce, when the boom cylinder is operated in combination with operating the other hydraulic actuator, the flow rate of the hydraulic fluid supplied from the boom control valve to the boom cylinder with respect to a manipulation amount of the manipulator from a flow rate to solely operate the boom cylinder to another flow rate to operate the boom cylinder in combination with operating the other hydraulic actuator to thereby reduce, from the first change rate to the second change rate, the amount of change in the flow rate relative to change in the manipulation amount, assuming that the manipulation amount of the manipulator to solely operate the boom cylinder is the same as the manipulation amount of the manipulator to operate the boom cylinder in combination with operating the other hydraulic actuator.

3. The working machine according to claim 2, wherein the boom control valve is pilot-operated by a pilot control pressure that is controlled by a control signal transmitted by the controller, and the boom flow-rate reducing unit is configured or programmed, when the boom cylinder is operated while the other hydraulic actuator is operated, to reduces the pilot control pressure to reduced the flow rate of the hydraulic fluid from the boom control valve to the boom cylinder to thereby reduce, from the first change rate to the second change rate, the amount of change in the flow rate relative to change in the manipulation amount.

4. The working machine according to claim 2, wherein the boom control valve is controlled in accordance with a current that is supplied to the boom control valve by the controller, and the boom flow-rate reducing unit is configured or programmed, when the boom cylinder is operated while the other hydraulic actuator is operated, to reduces the current supplied to the boom control valve to reduce the flow rate of the hydraulic fluid from the boom control value to the boom cylinder to thereby reduce, from the first change rate to the second change rate, the amount of change in the flow rate relative to change in the manipulation amount to the second change rate.

5. The working machine according to claim 2, further comprising:

an arm connected to an end of the boom in such a manner as to be swingable in an arm-crowd direction that is a direction toward the boom and an arm-dump direction that is a direction away from the boom; and an arm cylinder to cause the arm to swing, wherein the other hydraulic actuator is the arm cylinder, and when the boom cylinder is operated in combination with operating the arm cylinder, the boom flow-rate reducing unit is configured or programmed to reduces the flow rate of the hydraulic fluid supplied from the boom control valve to the boom cylinder with respect to the manipulation amount of the manipulator from a flow rate to solely operate the boom cylinder to another flow rate to operate the boom cylinder in combination with operating the arm cylinder to thereby reduce, from the first change rate to the second change rate, the amount of change in the flow rate relative to change in the manipulation amount, assuming that the manipulation amount of the manipulator to solely operate the boom cylinder is the same as the manipulation amount of the manipulator to operate the boom cylinder in combination with operating the arm cylinder.

6. The working machine according to claim 1, further comprising:

a variable displacement pump to deliver a hydraulic fluid to actuate a plurality of hydraulic actuators including the first hydraulic actuator and the second hydraulic actuator; and a load sensing system to control the pump such that a differential pressure obtained by subtracting the highest load pressure among load pressures of the plurality of hydraulic actuators from a delivery pressure of the pump is kept constant.

7. A working machine comprising:

a machine body;

a boom supported on the machine body in such a manner as to be vertically swingable;

a boom cylinder to cause the boom to vertically swing;

a boom control valve to control the boom cylinder;

an arm connected to an end of the boom in such a manner as to be swingable in an arm-crowd direction that is a direction toward the boom and an arm-dump direction that is a direction away from the boom;

an arm cylinder to cause the arm to swing; and a controller configured or programmed to control the boom control valve, wherein a controller includes a boom flow-rate reducing unite configured or programmed to when the boom cylinder is operated in combination with operating that arm cylinder, reduce an amount of change in the flow rate relative to change in a manipulation amount to operate the boom cylinder to an amount smaller that that when the boom cylinder is solely operated by reduction a flow rate of a hydraulic fluid supplied from the boom control valve to the boom cylinder; and the flow-rate reducing unit is configured or programmed to reduce the flow rate of the hydraulic fluid supplied from the boom control valve to the boom cylinder when the boom is raised while swinging the arm in the arm-crowd direction or when the boom is lowered while swinging the arm in the arm-dump direction.

8. A working machine comprising:

a machine body;

a boom supported on the machine body in such a manner as to be vertically swingable, a boom cylinder to cause the boom to vertically swing;

a boom control valve to control the boom cylinder;

a controller to control the boom control valve; and another hydraulic actuator that is different from the boom cylinder, wherein the controller is configured or programmed to, when the boom cylinder is solely operated without operating the other hydraulic actuator, control the boom control valve to change the flow rate of the hydraulic fluid supplied from the boom control valve to the boom cylinder at a first change rate that is an amount of change in the flow rate relative to a change in the manipulation amount when the boom cylinder is solely operated without operating the other hydraulic actuator;

the controller includes a boom flow-rate increasing unit configured or programmed to, when the other hydraulic actuator and the boom cylinder are operated in combination, reduce an amount of change in the flow rate relative to change in a manipulation amount to operate the boom cylinder to an amount smaller than that when the boom cylinder is solely operated by determining the flow rate of the hydraulic fluid supplied from the boom control valve with respect to the manipulation amount to operate the boom cylinder so that, when the manipulation amount to operate the boom cylinder is a manipulation amount adjacent to a pre-operation region to start operating the boom control valve, the flow rate determined by the boom flow-rate increasing unit is higher than the flow rate of the hydraulic fluid supplied from the boom control valve with respect to the manipulation amount to operate the boom cylinder when the boom cylinder is solely operated, and reducing, as the manipulation amount to operate the boom cylinder increases, a difference between the flow rate of the hydraulic fluid with respect to the manipulation amount to operate the boom cylinder when the other hydraulic actuator and the boom cylinder are operated in combination and the flow rate of the hydraulic fluid from the boom control valve with respect to the manipulation amount to operate the boom cylinder when the boom cylinder is solely operated reduces.

9. The working machine according to claim 8, wherein the boom control valve is pilot-operated by a pilot control pressure controlled by a control signal transmitted by the controller, and the boom flow-rate increasing unit increases the pilot control pressure when the other hydraulic actuator and the boom cylinder are operated in combination.

10. The working machine according to claim 8, wherein the boom control valve is controlled in accordance with a current supplied to the boom control valve by the controller, and the boom flow-rate increasing unit increases the current supplied to the boom control valve when the other hydraulic actuator and the boom cylinder are operated in combination.

11. The working machine according to claim 8, further comprising:

an arm connected to an end of the boom in such a manner as to be swingable in an arm-crowd direction that is a direction toward the boom and an arm-dump direction that is a direction away from the boom; and an arm cylinder to cause the arm to swing, wherein the other hydraulic actuator is the arm cylinder, and when the boom cylinder is operated while the arm cylinder is operated, the boom flow-rate increasing unit increases the flow rate of the hydraulic fluid supplied from the boom control valve to the boom cylinder.

12. The working machine according to claim 11, wherein the boom flow-rate increasing unit increases the flow rate of the hydraulic fluid supplied from the boom control valve to the boom cylinder when the boom is raised while swinging the arm in the arm-crowd direction or when the boom is lowered while swinging the arm in the arm-dump direction.

13. The working machine according to claim 8, further comprising:

a manipulator manipulable to operate the boom cylinder, the manipulation amount being defined as a manipulation amount of the manipulator, wherein the controller includes a control unit to control the flow rate of the hydraulic fluid supplied from the boom control valve to the boom cylinder in accordance with the manipulation amount of the manipulator when the boom cylinder is solely operated, and the boom flow-rate increasing unit causes the hydraulic fluid supplied from the boom control valve to the boom cylinder to have a flow rate with respect to the manipulation amount of the manipulator that is higher than a flow rate of the hydraulic fluid controlled by the control unit in accordance with the manipulation amount.

14. The working machine according to claim 8, wherein the controller does not allow the boom flow-rate increasing unit to function when the other hydraulic actuator is operated while the boom cylinder is solely operated in a direction in which the boom is raised.

* * * * *